United States Patent
Minowa et al.

[11] Patent Number: 5,620,393
[45] Date of Patent: Apr. 15, 1997

[54] POWER TRAIN CONTROLLER AND CONTROL METHOD

[75] Inventors: Toshimichi Minowa, Tokai-mura; Yoshiyuki Yoshida, Hitachi, both of Japan; Junichi Ishii, Novi, Mich.

[73] Assignee: Hitachi, Ltd., Tokyo, Japan

[21] Appl. No.: 523,607

[22] Filed: Sep. 5, 1995

[30] Foreign Application Priority Data

Sep. 2, 1994 [JP] Japan .................................. 6-209521

[51] Int. Cl.$^6$ ................................................ F02D 35/00
[52] U.S. Cl. .................................................... 477/155
[58] Field of Search .................................. 477/143, 154, 477/155

[56] References Cited

U.S. PATENT DOCUMENTS

| | | | |
|---|---|---|---|
| 4,690,017 | 9/1987 | Taniguchi et al. | 477/155 |
| 4,889,015 | 12/1989 | Kondo | 477/155 |
| 5,007,308 | 4/1991 | Narita | 477/155 |
| 5,035,159 | 7/1991 | Shibayama | 477/143 |
| 5,128,868 | 7/1992 | Imai et al. | 477/155 |
| 5,151,858 | 9/1992 | Milunas et al. | 477/155 |
| 5,182,710 | 1/1993 | Tomisawa | 477/143 |
| 5,337,239 | 8/1994 | Okada | 477/155 |

FOREIGN PATENT DOCUMENTS 3-117774  5/1991  Japan .
5-346162  12/1993  Japan .

*Primary Examiner*—Dirk Wright
*Attorney, Agent, or Firm*—Evenson McKeown Edwards & Lenahan, PLLC

[57] ABSTRACT

A power train controller and control method are provided for a passenger car driven by a combustion engine and an automatic gear changing transmission. Control sensors detect a current operating state of the passenger car. Three different modes of operation, including sports mode, economy mode, and comfortable mode are selected by the driver. Depending on the selected mode, the automobile transmission is controlled in different shifting patterns as a function of the sensed vehicle operating conditions.

29 Claims, 27 Drawing Sheets

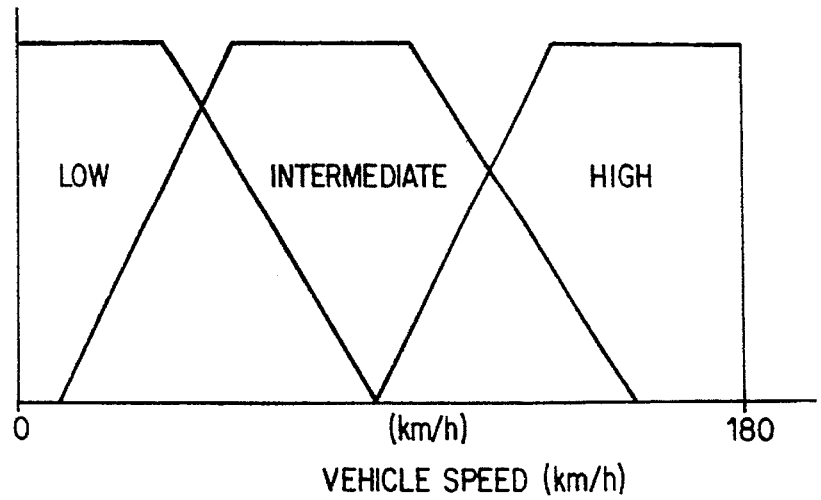

FIG. 22

| VEHICLE SPEED | FRONT-REAR ACCEL. | ROAD GRADIENT | HANDLE ANGLE | THROTTLE ANGLE | ROAD MODE |
|---|---|---|---|---|---|
| LOW | | GREAT GRADIENT IN ASCENT | GREAT | INTER-MEDIATE | SELECT CURVED ROAD CLIMBING MODE SPEED CHANGE LINE. |
| HIGH | | GREAT GRADIENT IN ASCENT | | LARGE | SELECT HIGH SPEED CLIMBING MODE SPEED CHANGE LINE. |
| INTER-MEDIATE | LOW | GREAT GRADIENT IN ASCENT | | LARGE | SELECT INTERMEDIATE AND LOW SPEED CLIMBING MODE SPEED CHANGE LINE. |
| INTER-MEDIATE | HIGH | GREAT GRADIENT IN DESCENT | | SMALL | SELECT DECENT MODE SPEED CHANGE LINE. |
| | | SMALL GRADIENT IN ASCENT AND DESCENT | | | SELECT FLAT ROAD MODE SPEED CHANGE LINE. |

FIG. 23

POWER TRAIN CONTROLLER AND CONTROL METHOD

BACKGROUND AND SUMMARY OF THE INVENTION

The present invention relates to a power train controller and control method suitable to facilitate precise driver control of a motorized passenger car with an automatic multigear speed changing transmission A first prior art power train control system for a passenger car is described in Japanese Published Patent Application No. 117774-1991. In this system the driver can select an economy mode and a power mode operation of the transmission, with the speed change line set faster for the power mode than for the economy mode. The desired speed change characteristics can be selected by manual switch operation.

A second prior art power train control system is described in Japanese Published Patent Application No. 346162-1993. This system introduces fuzzy inference to predict and infer the road conditions from the current operation conditions. The speed change line is modified according to the inferred road conditions, thereby obtaining speed changes such as acceleration and deceleration as desired by the driver to a certain extent.

According to the first prior art mentioned above, there are available speed change characteristics in the power mode where the speed change line is set on the side faster than that of the economy mode, in addition to speed change characteristics in the economy mode which consider only fuel combustion efficiency. Operation performances are also taken into account, though, to a limited extent, with the result that it has failed to cut down fuel costs as expected. The second prior art mentioned above was intended to operate with use of the fuzzy inference to determine the optimum speed change line, but was accompanied by such problems as failure to get speed changes such as acceleration and deceleration, as desired by the driver.

An object of the present invention is to provide a power train controller and control method to ensure operation of an automatic speed change transmission driven car as desired by the driver, in response to the car operating conditions and control functions which are different for different drivers (different driver preferences).

The above noted object of the present invention is attained by preferred embodiments of the present invention which comprise: (1) a control sensor to detect the current vehicle operating conditions and the amount of driver operation, (2) a driver intention prediction means reflecting the driver intention, (3) an operation mode selection means to select the operation mode predicted by the driver intention prediction means from two or more operation modes, (4) a control function selecting means to select at least two control functions according to the mode selected by the operation mode selecting means, and (5) a control amount computing means to compute the control amount of the control actuator, using the signals from the control sensor and control function selecting means.

In preferred embodiments of the invention, three operation modes are provided, namely: (i) economy mode, (ii) sports mode, and (iii) comfortable mode.

When the extra-low fuel cost "economy" operation mode is selected by the driver using the operation mode selecting means, two or more control functions are selected by the control function selecting means, for example, wide-area lockup control to achieve fuel cost reduction (to improve torque transmission efficiency by eliminating torque converter slide), fuel cost speed change control (the speed change point determined so as to operate the engine at the maximum point of the engine efficiency, with consideration given to torque transmission efficiency) and fuel cut control (fuel cut executed during deceleration and speed change), thereby enabling the operation which improves fuel cost efficiency as intended by the driver.

When the "sports" operation mode is selected, the control function selecting means selects such control as high rotation speed change control to change the speed at high rotation speed to improve the sense of acceleration, short speed change time control to prevent reduction in acceleration during speed change, or powerful engine brake control by shift-down around the corner inlet to run around corners at a high speed, thereby providing the operation in the "sports" mode intended by the driver.

When the "comfortable" operation mode is selected, the control function selecting means selects the equi-interval speed change control to make the speed change time intervals equal, smooth speed change control to make speed change time control and shock reduction compatible, or speed change line control to determine the speed change line in conformity to each gradient by inferring the road conditions (gradient, etc.) based on fuzzy theory.

Other objects, advantages and novel features of the present invention will become apparent from the following detailed description of the invention when considered in conjunction with the accompanying drawings.

BRIEF DESCRIPTION OF THE DRAWINGS

FIG. 22 shows the membership function of the vehicle speed sensed by the driver during comfortable operation mode of the control system of FIGS. 1–3;

FIG. 23 shows the result of evaluating the road conditions obtained from the fuzzy rule during comfortable operation mode Of the control system of FIGS. 1–3;

DETAILED DESCRIPTION OF THE DRAWINGS

Figure 1:
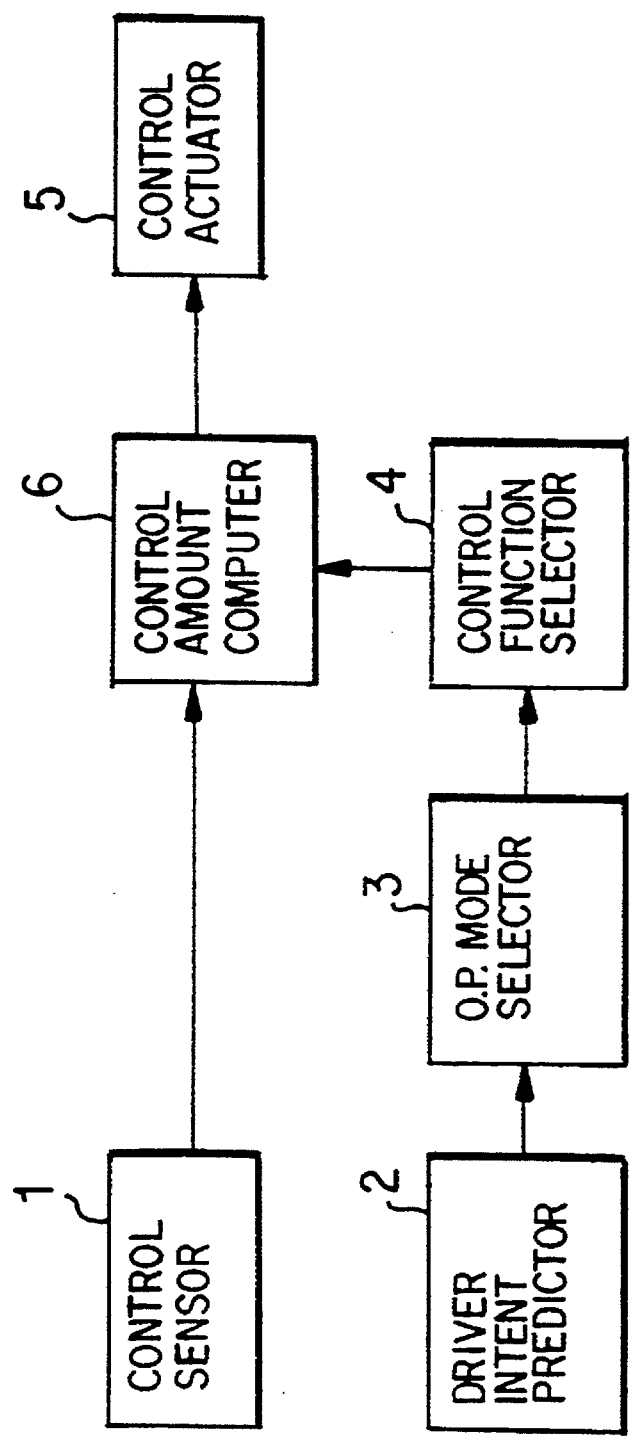
FIG. 1 is a schematic block diagram depicting the basic overall arrangement of a vehicle control system constructed according to preferred embodiments of the present invention.
Figure 2:
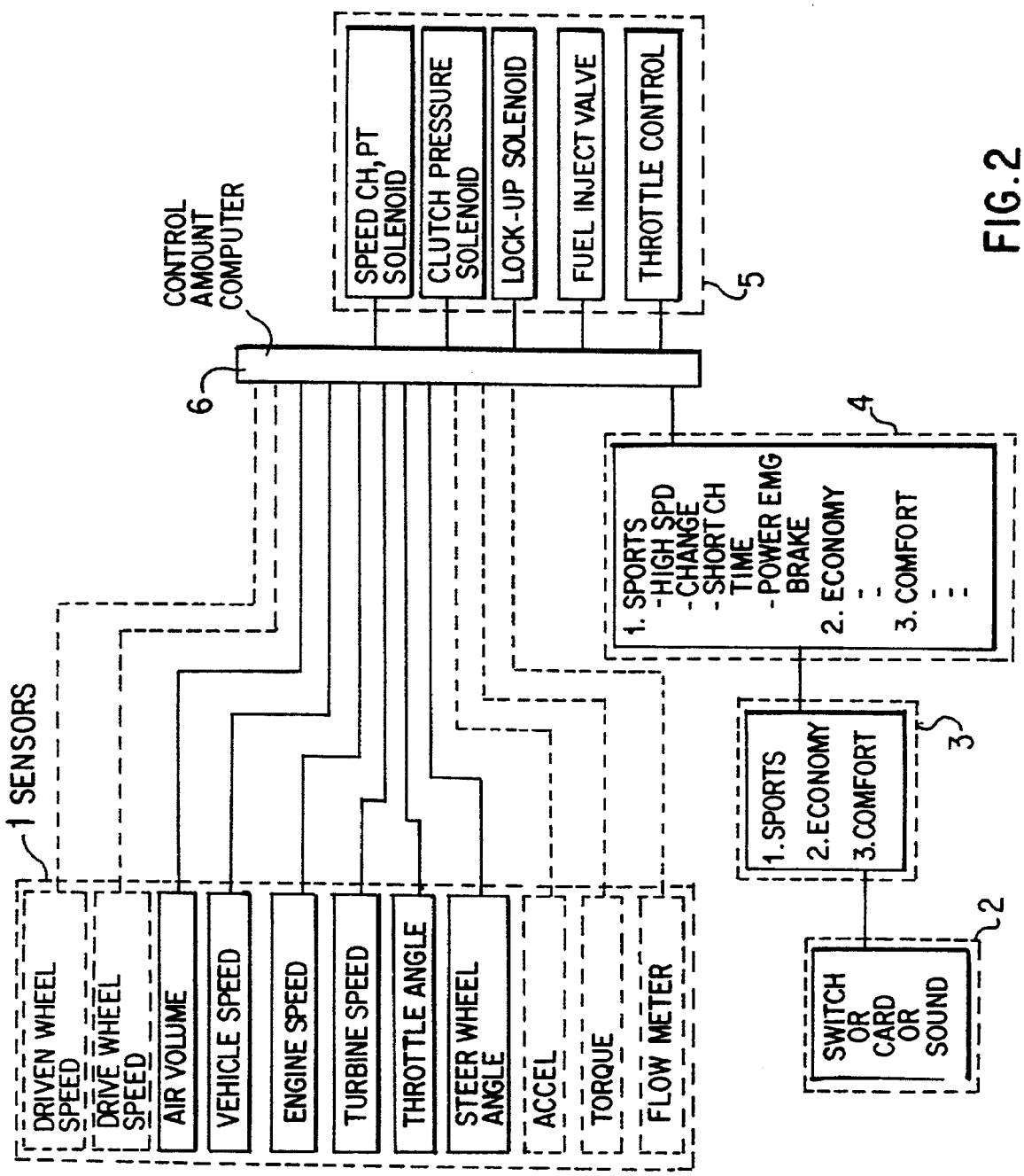
FIG. 2 is a schematic detailed block diagram of the cont system of FIG. 1.

The following provides a detailed description of the power train controller and control method according to preferred embodiments of the present invention. Referring to FIGS. 1 and 2, the control system comprises controls sensor 1 to detect the current running state and driver operation amount, a driver intention prediction means 2 to predict the driver intention, an operation mode selecting means 3 to select the operation mode predicted by said driver intention prediction means 2 from multiple operation modes, a control function selecting means 4 to select multiple control functions according to the mode selected by said operation mode selecting means, and a control amount computing means 6 to compute the control actuation amount of a control actuator 5 using the signals of the control sensors 1 and the control function selecting means 4.

FIG. 2 is a block diagram showing details of FIG. 1. The control sensors 1 to be used in the illustrated preferred embodiment include an engine intake air volume sensor, a wheel speed sensor, an engine speed sensor, a turbine speed sensor, a throttle angle sensor, a steering wheel angle sensor, an acceleration sensor, a torque sensor and flow meter angle sensor. The driven wheel sensor shown in broken lines and drive wheel speed sensor are used to ensure safety of the car by adequate management of the slip rate between the drive and driven wheels. The car acceleration and drive shaft torque is calculated using the differentiation of each wheel speed and the torque converter characteristics. It is also contemplated to use the acceleration sensor shown in the broken line and torque sensor in certain preferred embodiments. Furthermore, a flow meter angle sensor is utilized in certain embodiments to make electronic control of the amount of air for the throttle valve or the like (control actuator: electronic throttle).

A manually operable ON/OFF switch, an electronic card and/or sound are used by the driver to select the mode of the driver intention prediction means 2 according to various preferred embodiments of the invention. The operation mode selecting means 3, for example, causes "sports" operation flag ("flag" meaning signal "1" or "0" depicting whether selected or not), extra-low fuel cost "economy" operation flag, and "comfortable" operation flag to be generated for the output from driver intention prediction means 2, thereby providing control according to the selected operating mode.

The control function selecting means 4 selects at least two control functions for each of said operation modes. In the "sports" operation mode, for example, in order to make high speed operation on mountainous roads within the speed limit, the system executes multiple control functions, such as high rotation speed change by upshift, or powerful engine brake and short time speed change by down-shift. In the extra-low fuel cost "economy" operation mode, the speed change point is determined to ensure that the drive system transmission efficiency is taken into account under any road conditions, and the fuel is reduced during the speed change and deceleration, with the lockup area expanded while giving consideration to vibration to some extent. The "comfortable" operation mode provides running satisfactory to all drivers to a certain extent. For example, the same time interval is assigned to the speed change when upshifting between gears 1 and 2 and when upshifting between gears 2 and 3. Also, shocks due to speed change are reduced so that the driver does not sense the same. In preferred embodiments the road conditions are inferred using fuzzy logic theory to determine the speed change line to reflect the driver's intention to some extent.

Control amount computing means 6 is used to compute the control amount according to the control function selected by the control function selecting means 4, and the result is output to control actuator 5, for example, a speed change point control solenoid, a clutch operation pressure control solenoid, a lockup control solenoid and a fuel injection valve. An electronic control throttle is used when air volume control is to be added according to certain preferred embodiments. Such electronic control is used to adjust the engine speed when changing the speed for powerful engine brake control; this will ensure smooth speed reduction. It is also contemplated to realize the driver intention prediction means according to control sensor signals.

Figure 3:
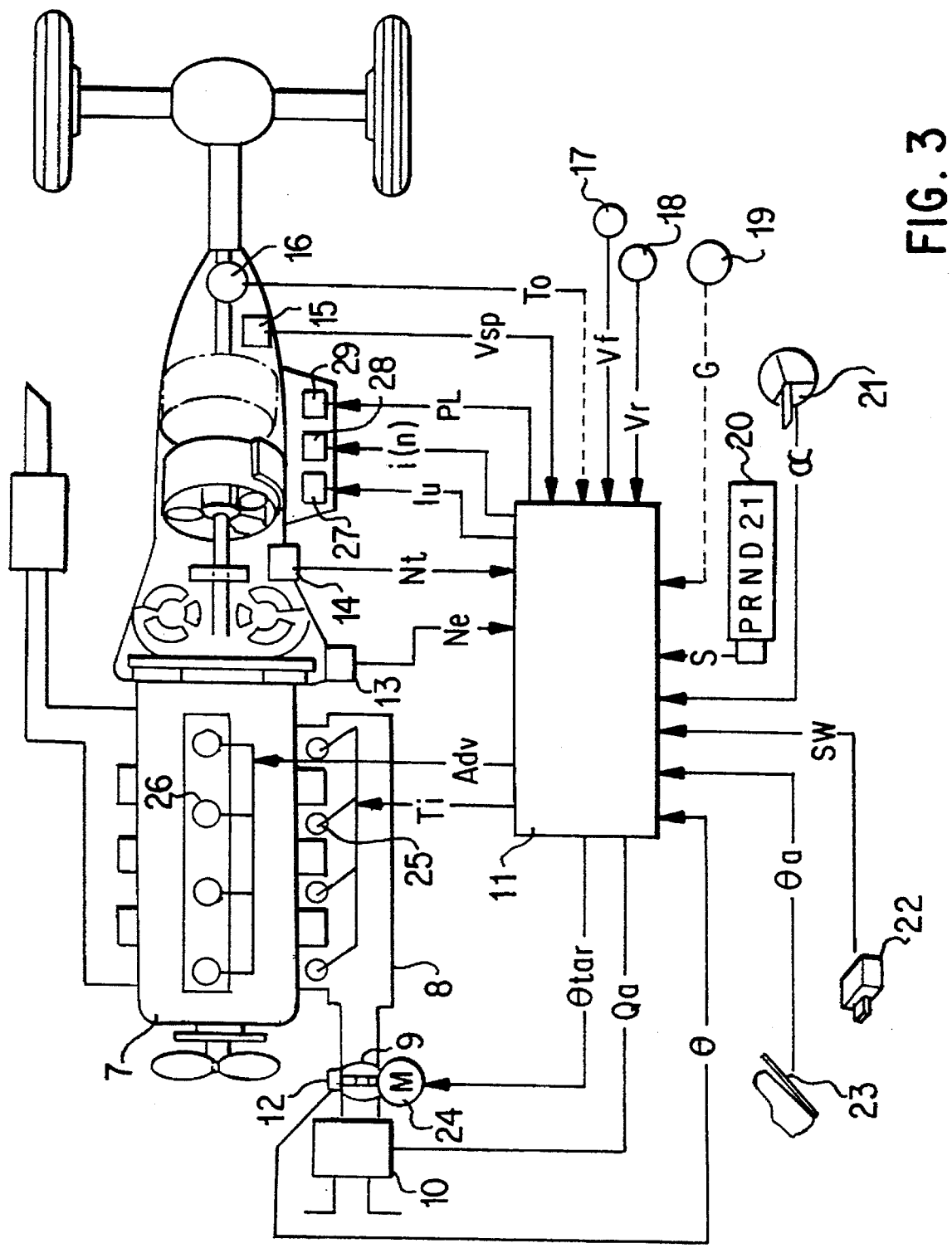
FIG. 3 is a schematic diagram representing a passenger car with the system configuration of FIGS. 1 and 2.

FIG. 3 shows the overall system configuration. Air is sucked in through a throttle valve 9 installed on an air suction pipe 8 of a vehicle combustion engine 7. This air volume is detected by air flow meter 10, which provides a corresponding signal Qa which is input to control unit 11. Throttle angle signal θ, engine speed signal Ne, turbine speed signal Nt, vehicle speed signal Vsp, torque signal To, driven wheel speed signal Vf, drive wheel speed signal Vr, acceleration signal G, shift position signal S, steering wheel angle signal α, mode switch signal SW and flow meter angle signal θa are detected and produced by throttle angle sensor 12, engine speed sensor 13, turbine speed sensor 14, wheel speed sensor 15, torque sensor 16, driven wheel speed sensor 17, drive wheel speed sensor 18, acceleration sensor 19, shift position switch 20, steering wheel angle sensor 21, mode switch 22, and flow meter angle sensor 23, respectively. These control sensor signals are input to the control unit 11, and target throttle angle θtar, fuel inspection width Ti, firing period Adv, lockup duty lu, speed change ratio i(n) and hydraulic duty PL are output from control unit 11 to electronic control throttle 24, fuel injection valve 25, firing unit 26, lockup control solenoid 27, speed change point control solenoid valve 28, and clutch operation pressure control solenoid 29, respectively. This system configuration realizes a preferred embodiment of the present invention, and its operation in the three driver selectable modes of operation is described in detail herein in conjunction with FIGS. 4 to 30.

Figure 4:
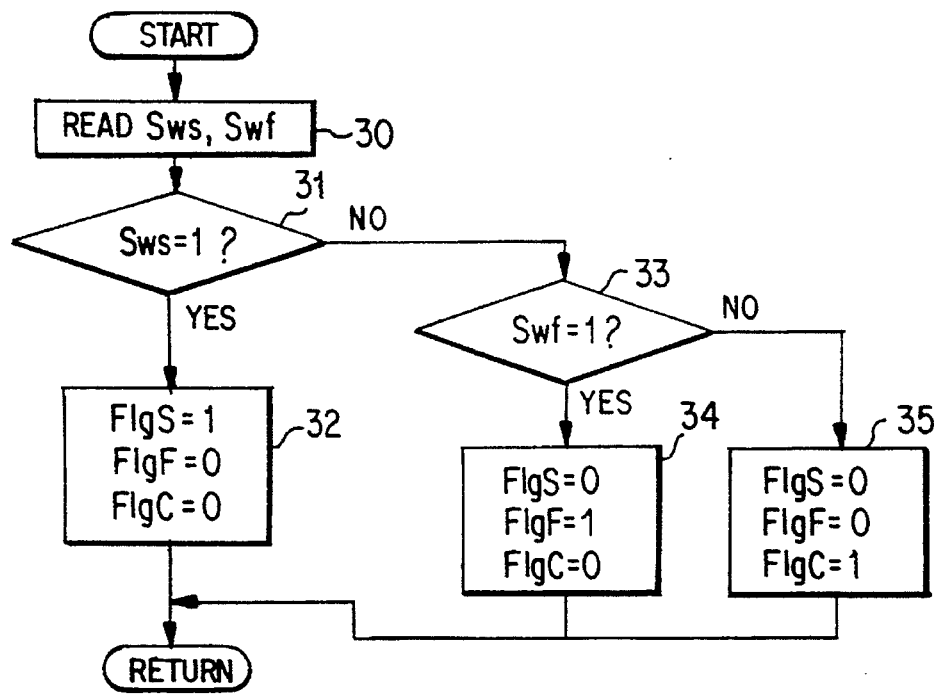
FIG. 4 is a control flow chart depicting setting of the operation mode of the control system of FIGS. 1–3.

FIG. 4 is a control process flow chart depicting setting of the operation mode. The blocks of this and other flow charts depict steps in the control operation which are carried out by the computer control unit 11. After starting the system (block "start"), the system is checked in Step 30 to determine whether the "sports" operation mode switch SWs and the "economy" operation mode switch SWf are on or off. Here the driver's intention is inferred by using these two switches SWs and SWf. When the two switches SWs and SWf are off, the mode is "comfortable" operation mode. In step 31 the condition of switch SWs is checked to determine if it is 1 or 0, "1" being on, "0" being off. If it is "1", the setting of the "sports" operation mode flag FlgS=1 is carried out in step 32. If it is other than 1, then the condition of switch SWf is checked in step 33. If switch $SW_f$ is on (condition "1"), then the "economy" operation mode flag FlgF=1 is set in step 34. If the switch SWf is in a condition other than "1", the "comfortable" operation mode flag FlgC=1 is set in step 35.

Figure 5:
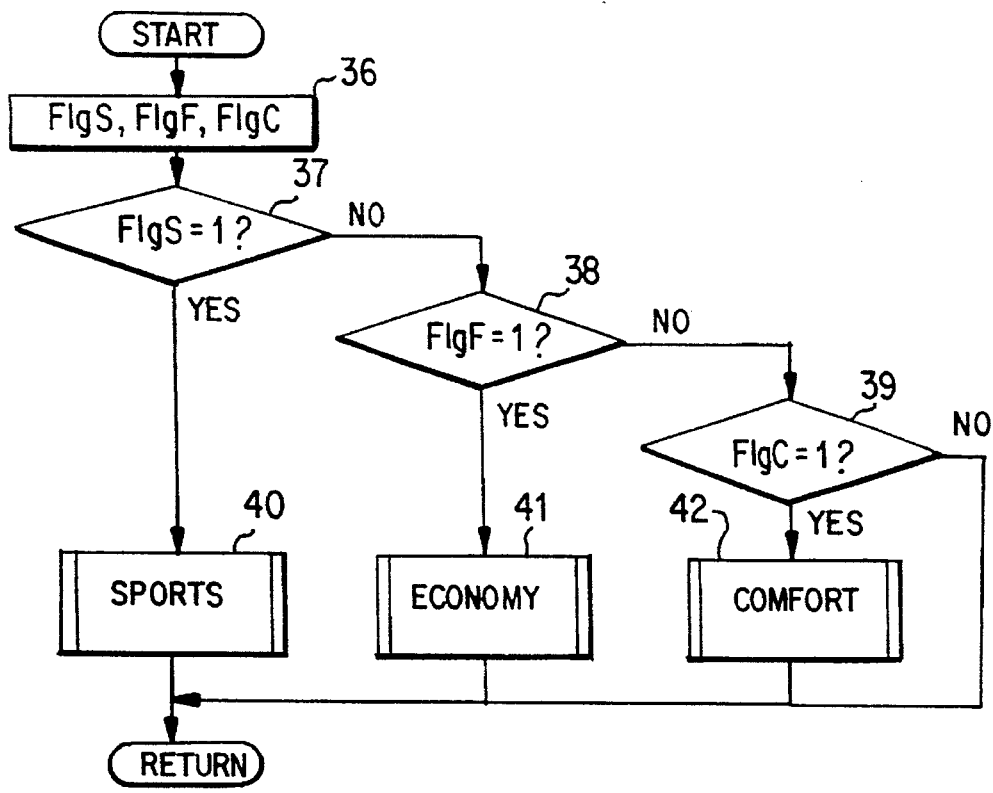
FIG. 5 is a control flow chart depicting execution of initiation the operation mode of the control system of FIGS. 1–3.

FIG. 5 is a control flow chart depicting execution of the operation mode. Firstly, flag FlS, FlgF and FlgC set up as described in FIG. 4 are read in step 36, and whether they are on ("1") or not is checked in steps 37, 38 and 39, respectively. If they are on 1, the sub-routines of sports operation mode control 40, extra-low fuel cost operation mode control 41 and comfortable operation mode control 42, respectively, are initiated.

Figure 6:
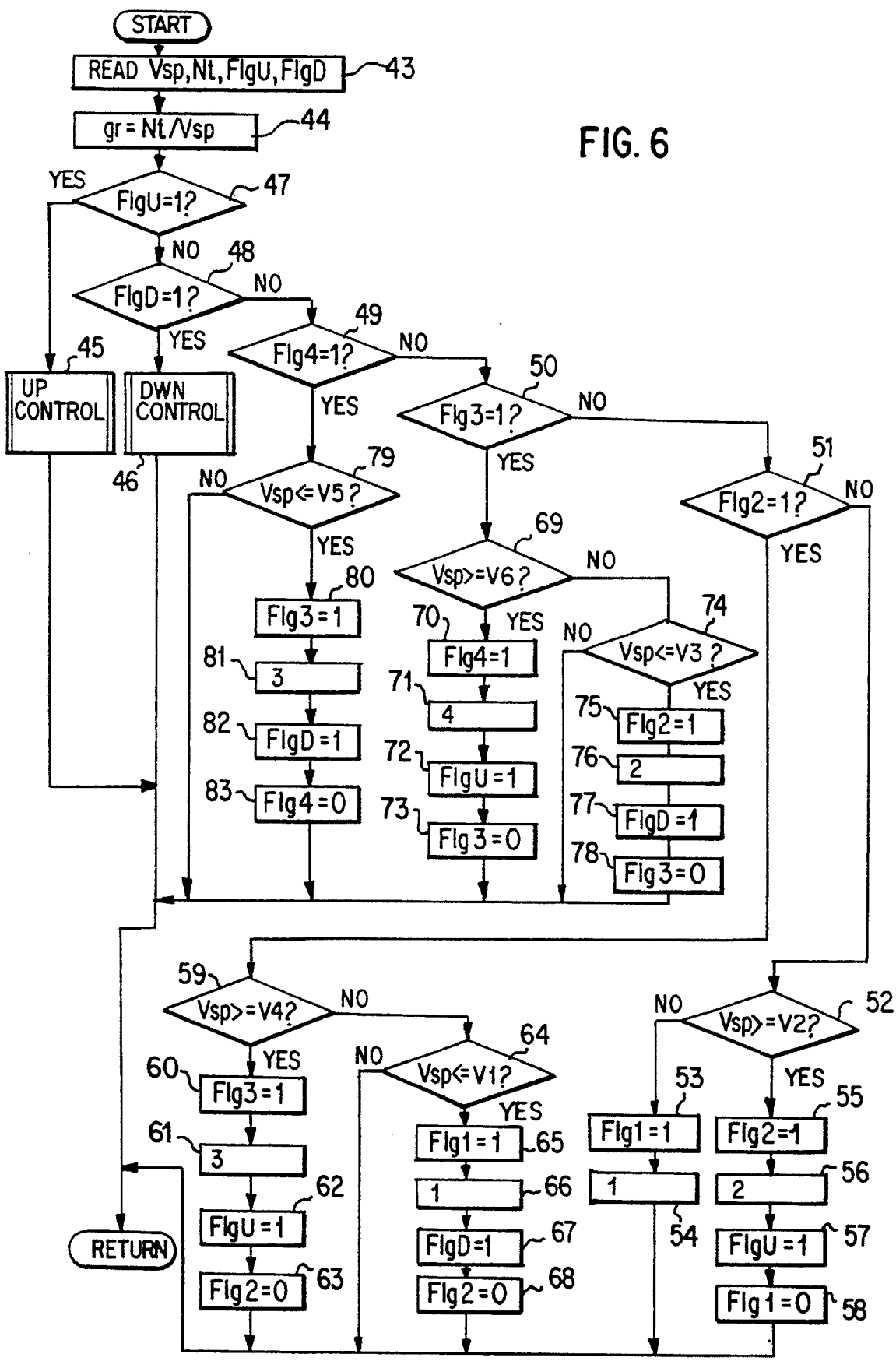
FIG. 6 is a control flow chart depicting speed change point control when the sports operation mode is selected, using the control system of FIGS. 1–3.
Figure 7:
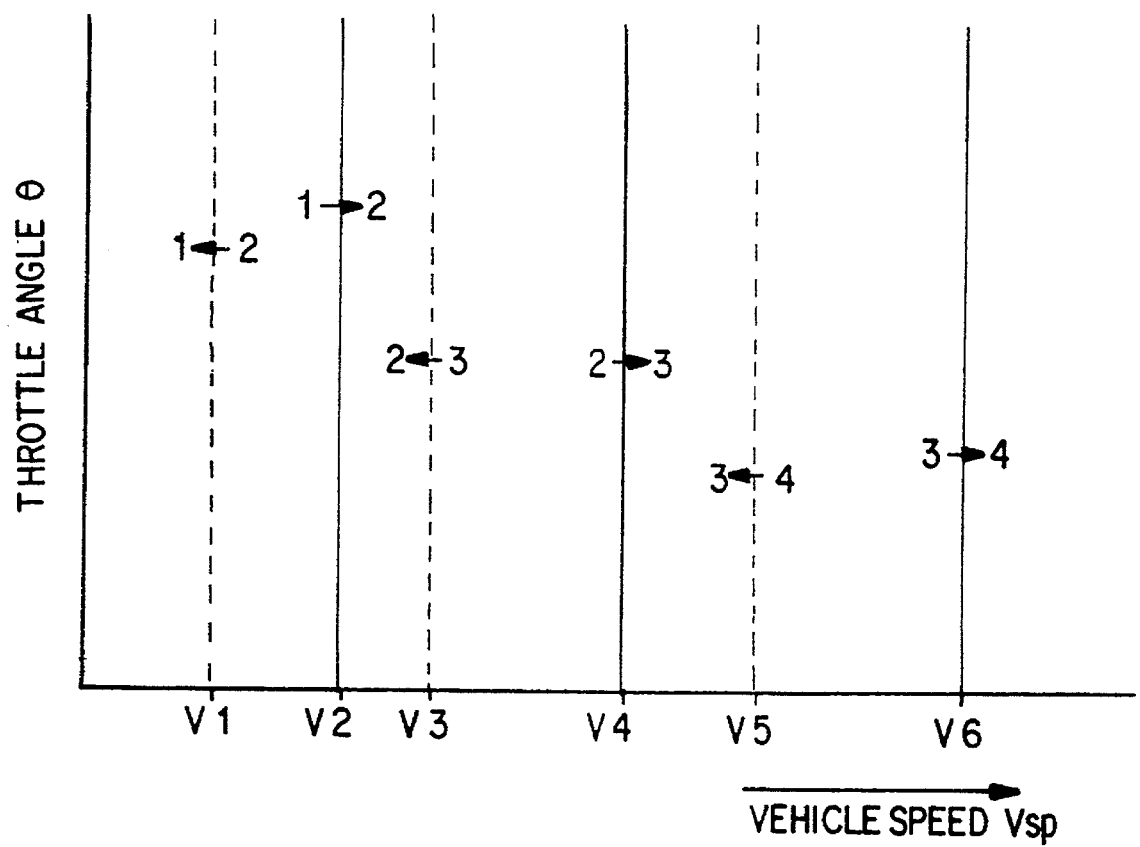
FIG. 7 depicts a speed change line used for speed change point control during sports operation mode of the control system of FIGS. 1–3.

The sports operation mode control function will be described with reference to FIGS. 6 to 11. FIG. 6 is a speed change point control flow chart, while FIG. 7 is a speed change line used in the speed change point control. The vehicle speed Vsp, turbine speed Nt, FlgU and FlgD (for "upshift" and "downshift" to be discussed later) are read in step 43. In step 44, the input/output rotation speed ratio, so-called gear ratio gr, of the speed change mechanism is calculated from Nt/Vsp. This is used in the sub-routine of the control during speed change (up-shift control 45 and downshift control 46) to be described later. In step 47, whether flag FlgU 1 is or not indicates an up-shift condition, while in step 48, whether flag FlgD is 1 or not indicates a down-shift condition. If flag FlgU is "1", upshift control is initiated in step 45. If flag FlgD is "1", then downshift control is initiated instep 46.

If neither of FlgU and FlgD are "1" the steps 49, 50 and 51 are carried out. When the engine has started, FLgs. 4, 3 and 2 are set to "0" by initialization. Accordingly, the speed-1 or gear 1 state is in the car speed 0. In step 52, the speed change line of FIG. 7 is searched, to check whether or not the current Vsp is equal to or greater than V2. Here the solid line in FIG. 7 shows the up-shift line, while the broken line represents the down-shift line. The speed change line is set to the same car speed despite the changes in throttle angle; this is because operation of the control system like in a manual transmission car is intended when the driver selects the sports mode.

In FIG. 7, point VI indicates the vehicle speed for a downshift from second to first gear (gear 2 to gear 1), point V2 indicates the vehicle speed for an upshift from gear 1 to gear 2. The downshift and upshift point for transitions between gears 2, 3 and 4 are depicted at the respective vehicle speeds V3–V6.

If the result is NO in step 52 (vehicle speed not equal to or greater than the gear 1 to gear 2 upshift speed V2), 1 is set to Flg1 in step 53, and the speed-1 (gear 1) signal is output in step 54. If the result is YES Flg2 is set to "1" in step 55 and speed 2 is output in step 56. The up-shift flag FlgU is set to 1 in step 57 and Flg1 is set to 0 in step 58. YES in step 51 now indicates an output YES for Flg2=1. Whether or not the current Vsp is equal to or greater than V4 is then checked in step 59. If the result is YES, in step 60, Flg3 is set to 1, and the speed-3 signal is output in step 61. Then upshift flag FlgU is set to 1 in step 62, and Flg2 is set to 0 in step 63. If the result is NO, the step 64 checks whether or not the current Vsp is equal to or smaller than V1. If the result is YES, Flg1 is set to 1 in step 65, and speed-1 is output in step 66. Down-shift flag FlgD is set to 1 in step 67, and Flg2 is set to 0 in step 68. If the result is NO, return is executed. The speed change line control for other gear shifting is carried out from step 69 to step 83 according to a similar control pattern as described for upshift and downshift between gears 1, 2 and 3.

Figure 8:
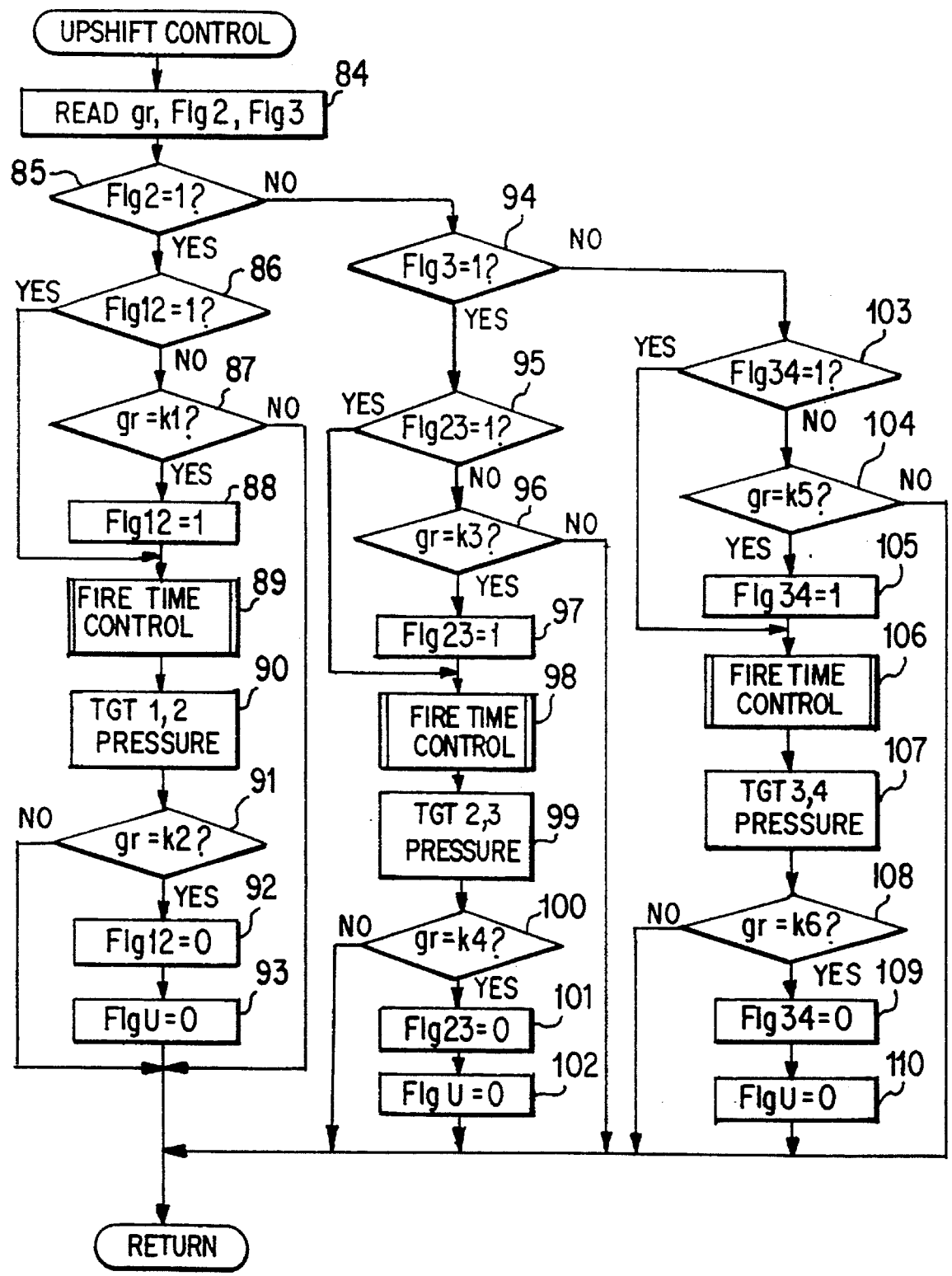
FIG. 8 is a control flow chart for up-shift control during sports operation mode of the control system of FIGS. 1–3.
Figure 10:
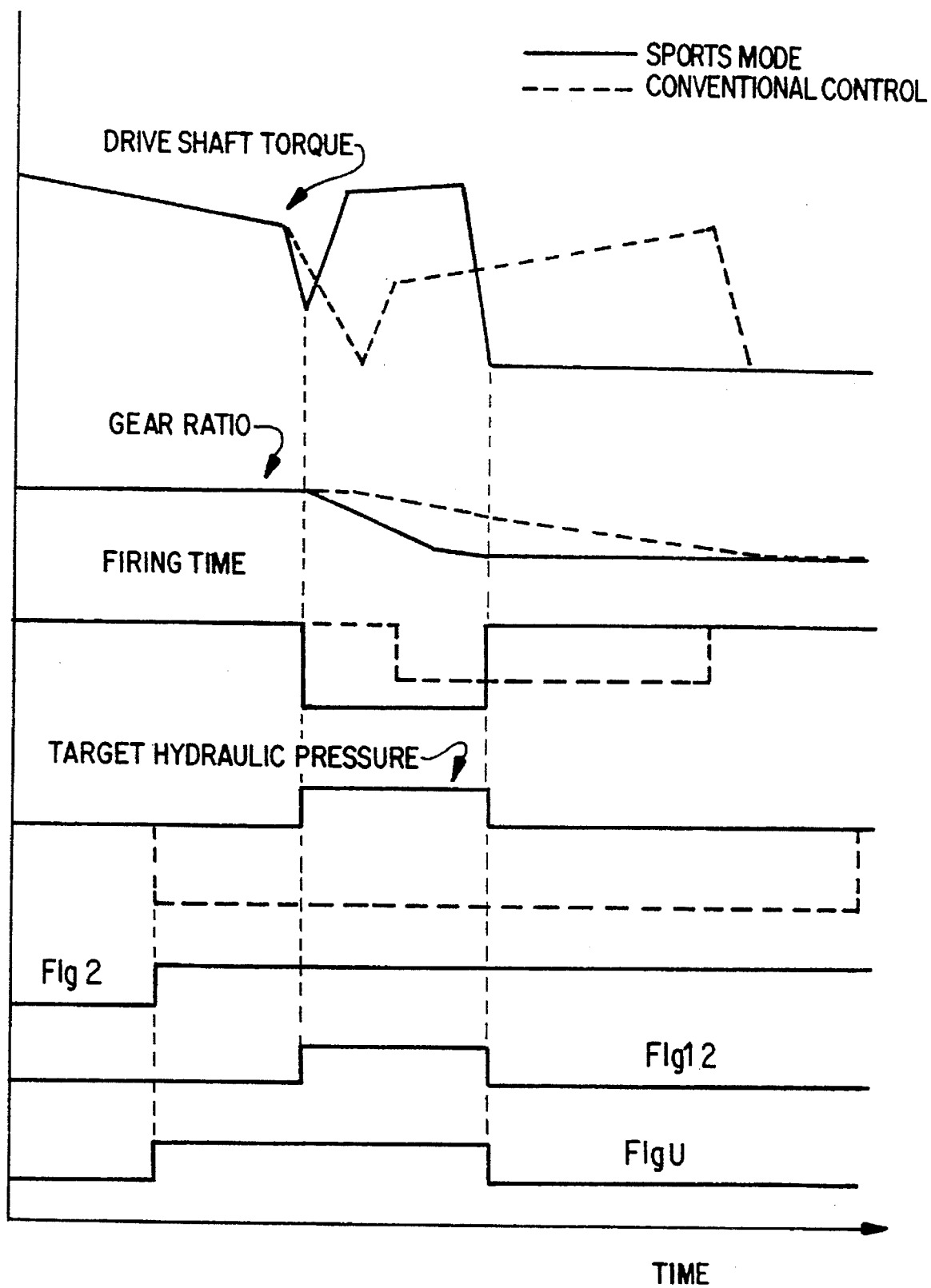
FIG. 10 is an up-shift time chart during sports operation mode of the control system of FIGS. 1–3.

FIG. 8 is a control flow chart for up-shift control, and FIG. 10 is a time chart for up-shift control. In FIG. 8, gear ratio gr, speed-2 flag Flg2 and speed-3 flag Flg3 are read in step 84, and whether Flg2 is set to 1 or not is checked in step 85. If the result is YES, whether speed change control start flag Flgl2 is 1 or not is checked in step 86. If it is not, it denotes between the area where Flg2 in FIG. 10 is on and the area where Flgl2 is on. Thus, step 87 checks whether the gear ratio gr has reached the speed change control starting time constant kl or not. If the result in step 87 is YES, Flgl2 is set to 1 in step 88. That is, the control unit judges that it is necessary to perform engine torque control and hydraulic pressure control during speed change. Then the target hydraulic pressures for the firing time lead time control and speed change to speed-1 to -2 are searched and are output in step 89 and step 90, respectively. Then the Step 91 checks whether the gear ratio gr has reached the speed change control terminating time constant k2 or not. If the result is YES, Flgl2 is set to 0 in step 92, and FlgU is set to 0 in step 93. This will complete the control sub-routine for up-shift shown in FIG. 6. After that, engine control and hydraulic control during speed change are carried out in steps 94 to 110 for upshifts to higher gears (gears 3 and 4) according to a similar control pattern as given above for the upshift between gears 1 and 2.

In FIG. 10, the solid line shows the control according the present invention, while the broken line denotes the conventional control. In the conventional control, hydraulic pressure drop and engine torque are reduced by the firing time lead time, thereby controlling fluctuation of the torque during speed change. In the "sports" operation mode according to the present invention, by contrast, the hydraulic pressure is raised and firing time is retarded to minimize the speed change time, thereby improving the sense of acceleration. That is, in the "sports" operation mode, shocks in speed change with a strong sense of acceleration are acceptable to the driver who has chosen this mode.

Figure 9:
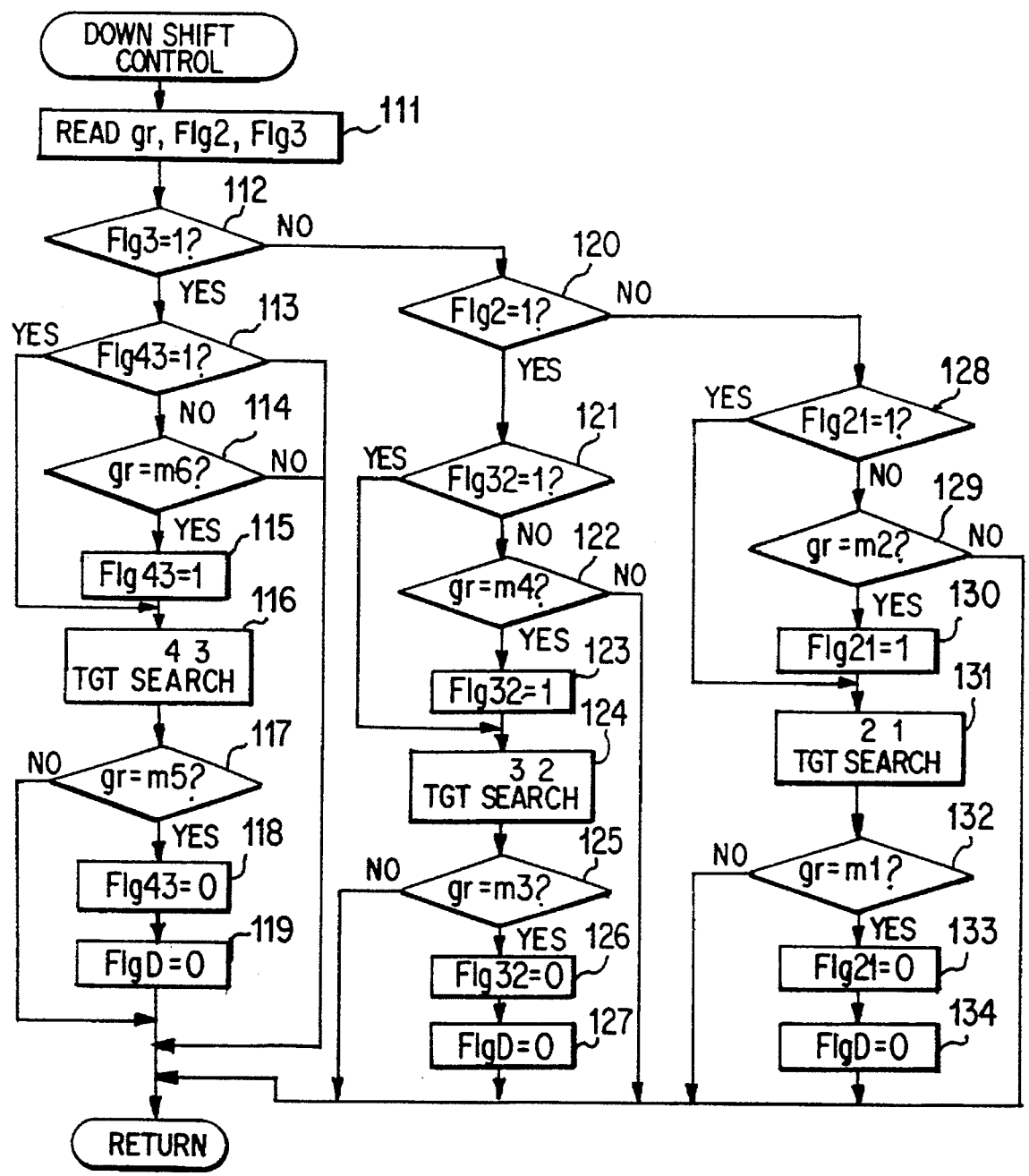
FIG. 9 is a control flow chart for down-shift control during sports operation mode of the control system of FIGS. 1–3.
Figure 11:
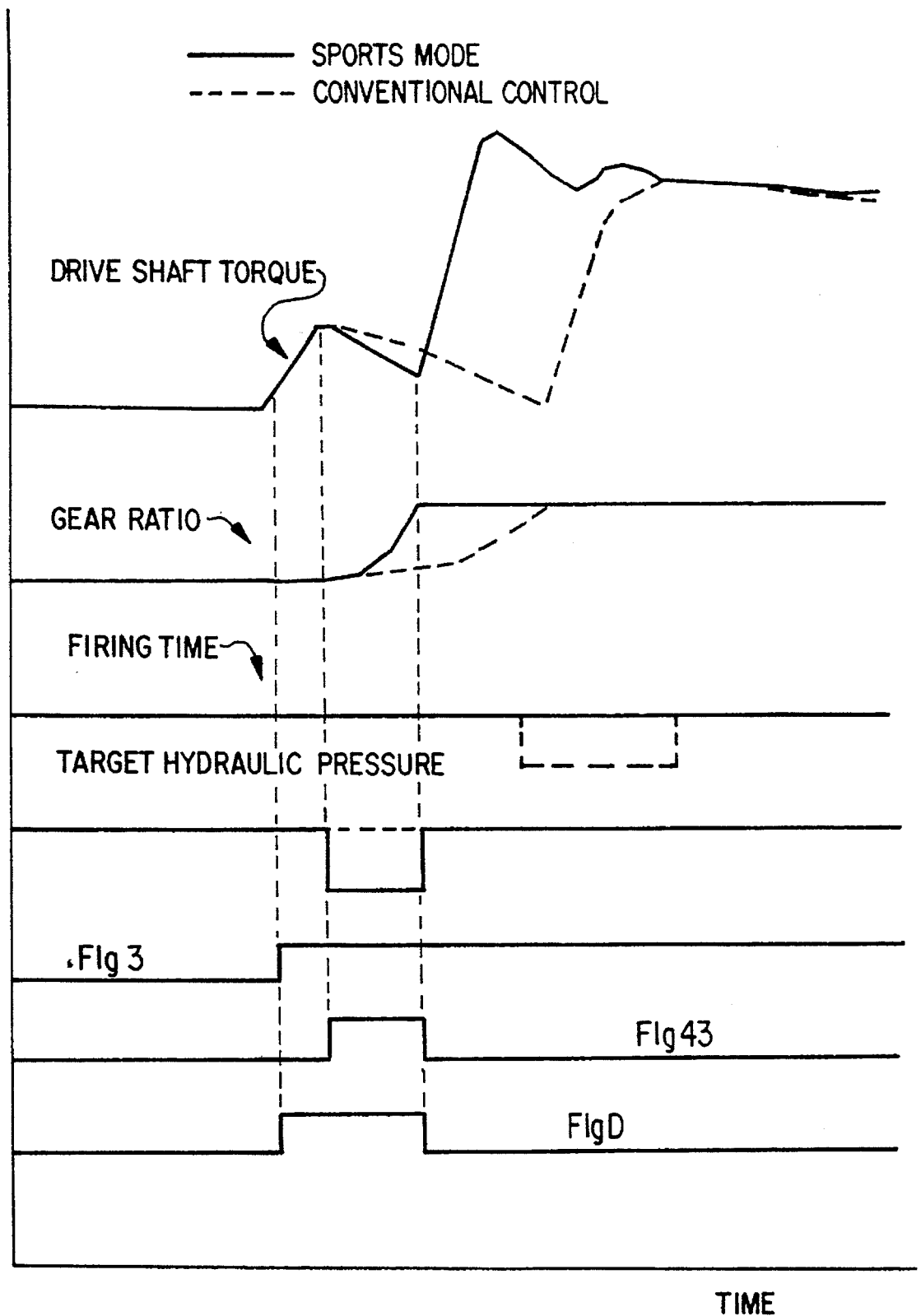
FIG. 11 is a down-shift time chart during sports operation mode of the control system of FIGS. 1–3.

FIG. 9 is a control flow chart for down-shift control, and FIG. 11 is a time chart for down-shift for the sports mode of operation. FIG. 9 shows gear gr, speed 2 flag Flg2 and speed 3 flag Flg3 being read in step 111. Whether Flg3 is 1 or not is checked in step 112. If the result is YES, whether speed change control starting flag Flg43 is 1 or not is checked in step 113. If the result is not 1, it denotes between the area where Flg3 in FIG. 11 is on and the area where Flg43 is on. Thus, step 114 checks whether the gear ratio gr has reached the speed change control starting time constant m6 or not. If the result is YES, Flg43 is set to 1 in step 115. That is, the control unit judges that it is necessary to perform hydraulic pressure control during speed change. Then the target hydraulic pressures for speed change from speed-4 to -3 are searched and output in step 116. After that, whether the gear ratio gr has reached the speed change control starting time constant m5 or not is checked in step 117. If the result is YES, Flg43 is set to 0 in step 118, and FlgD is set to 0 in step 119. This will complete the control sub-routine for downshift shown in FIG. 6. After that, hydraulic pressure control is possible from step 120 to step 134 according to a similar control pattern as given above for the other downshift sequences.

In the downshift mode for sports mode operation, quick, abrupt torque changes are desired; therefore, the torque is increased by hydraulic pressure control during speed change, without the engine torque reduction control being performed. In FIG. 11, the solid line shows the control according to the present invention, while the broken line denotes the conventional control. In the conventional control, vibration after speed change is reduced by ignition retardation at the time of firing, to control the torque after speed change. In the sports operation mode according to the present invention, by contrast, the speed change time is reduced only by reduction in hydraulic pressure, without vibration after speed change being controlled; thus, the sense of acceleration is improved. In the down-shift of the "sports" operation mode, shocks in speed change are acceptable to the driver who has chosen this mode.

Figure 12:
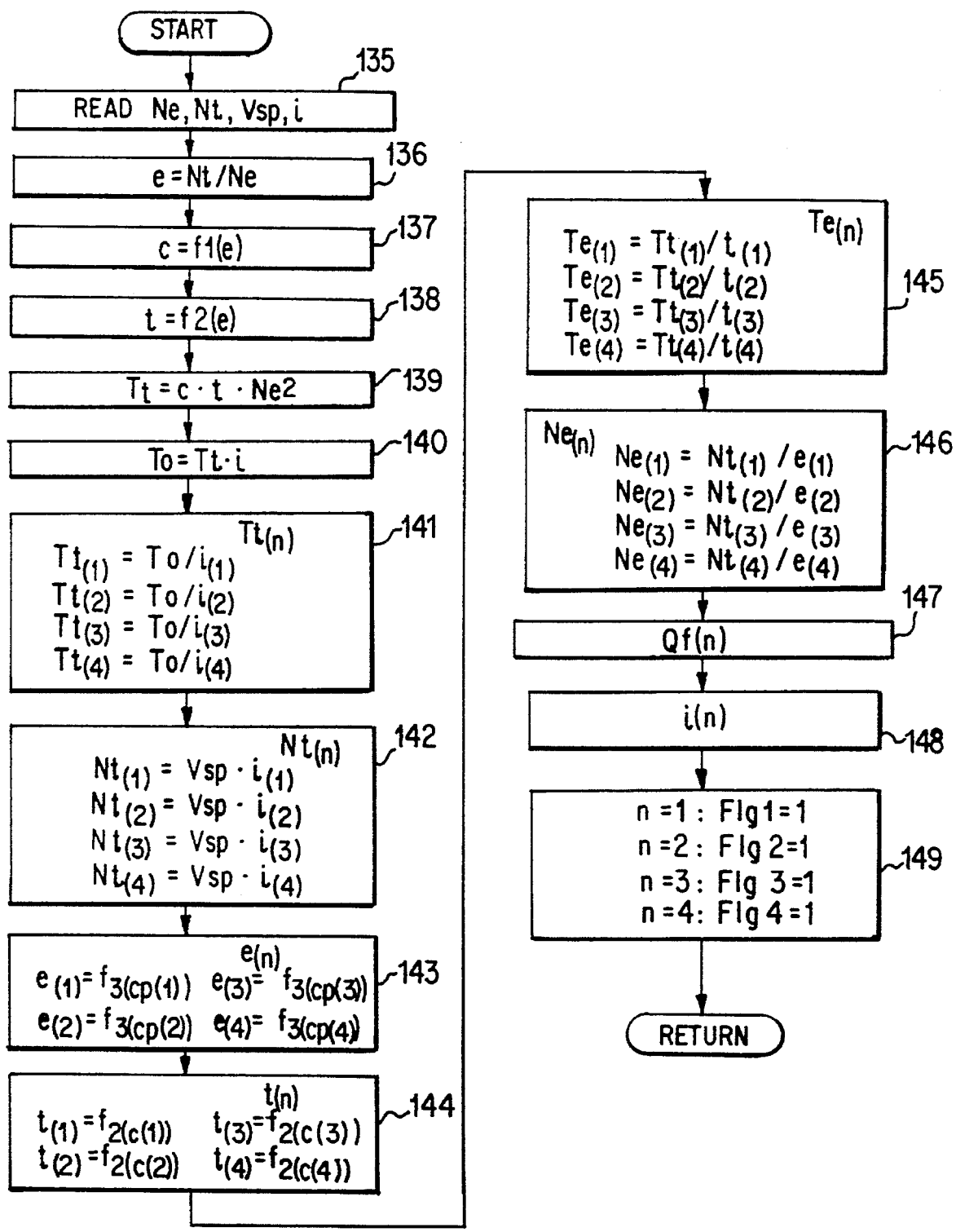
FIG. 12 is a flow chart depicting a fuel cost speed change point calculation formula when the torque converter is used during economy operation mode of the control system of FIGS. 1–3.

The extra-low fuel cost "economy" operation mode control function will be described with reference to FIGS. 12 to 20. FIG. 12 shows the economy operation mode speed change point calculation method when the torque converter is used. FIG. 14(a) illustrates the torque converter characteristics, FIG. 14(b) the reverse pump capacity coefficient characteristics, and FIG. 15(a) the fuel consumption characteristics. Engine speed Ne, turbine speed Nt, vehicle speed Vsp and speed change ratio i are read in step 135. In step 136, torque converter input/output shaft rotation speed ratio, so called "e", is calculated from Nt/Ne. In steps 137 and 138, the characteristic which is a function of "e" in FIG. 14(a) is used to search the pump capacity coefficient c and torque ratio t. In step 139, equation (1) comprising said Ne, c and t is used to calculate the turbine torque Tt.

$$Tt = c \cdot t \cdot Ne^2 \qquad \text{equation (1)}$$

In step 140, the speed changer output shaft torque, so called drive shaft torque To is calculated using the said Tt and current speed change ratio i. Furthermore, the torque sensor may be used for this drive shaft torque To. In step 141, the To calculated above and the speed change ratio i(n) of the speed changer mounted on the car is used to calculate turbine torque Tt(n) for each speed rate. In the illustrated preferred embodiment, a speed changer transmission with four speeds or gears is provided. In step 142, Vsp and i(n) are used to calculate turbine speed Nt(n) for each speed change ratio. In step 143, the speed rate e(n) for each speed change ratio is determined according to equation (2), using the reverse pump capacity coefficient cp characteristic which is a function of e in FIG. 14(b). The reverse pump capacity coefficient cp characteristic can be obtained from equation (3).

$$cp = Tt/Nt^2 \qquad \text{equation (2)}$$

$$cp = t \cdot c/e^2 \qquad \text{equation (3)}$$

In step 144, speed rate e (n) determined as above and torque ratio t characteristics of FIG. 14(a) are used to calculate the torque t(n) for each speed change ratio. Then engine torque Te(n) and engine speed Ne(n) are calculated for each speed change ratio in step 145 and step 146. In step 147, Te(n) and Ne(n) are used to search the fuel consumption cost Qf data table comprising the engine torque and engine speed of FIG. 15(a) for each speed change ratio and to find out the speed change ratio i(n) of the minimum fuel consumption. Then the speed change ratio i(n) of the minimum fuel consumption is output in step 148; as a result, the variable of the speed change ratio which is output in step 149, the said flag Flgl in the case of n=1, for example, is set to 1.

Figure 13:
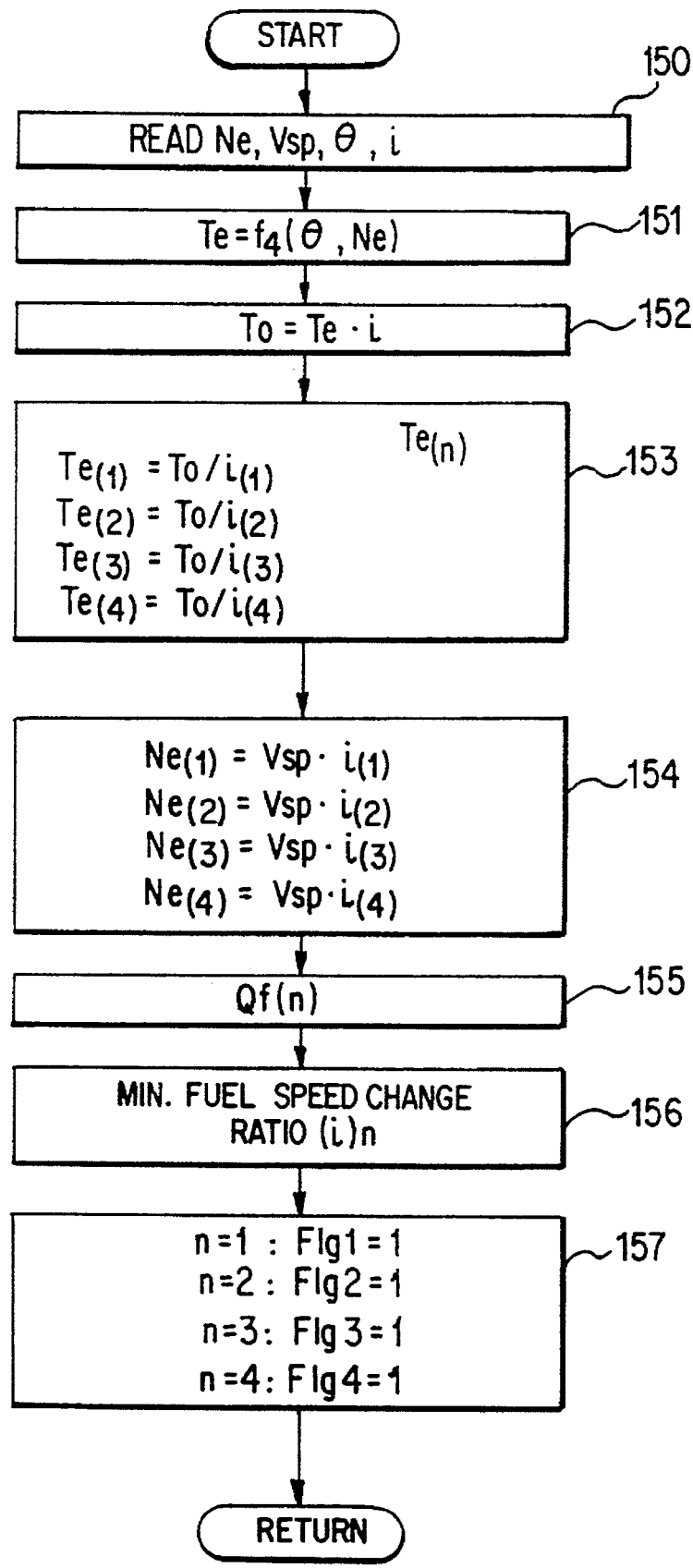
FIG. 13 is a flow chart depicting a fuel cost speed change point calculation formula when the lock converter is used during economy operation mode of the control system of FIGS. 1–3.
Figure 14A:
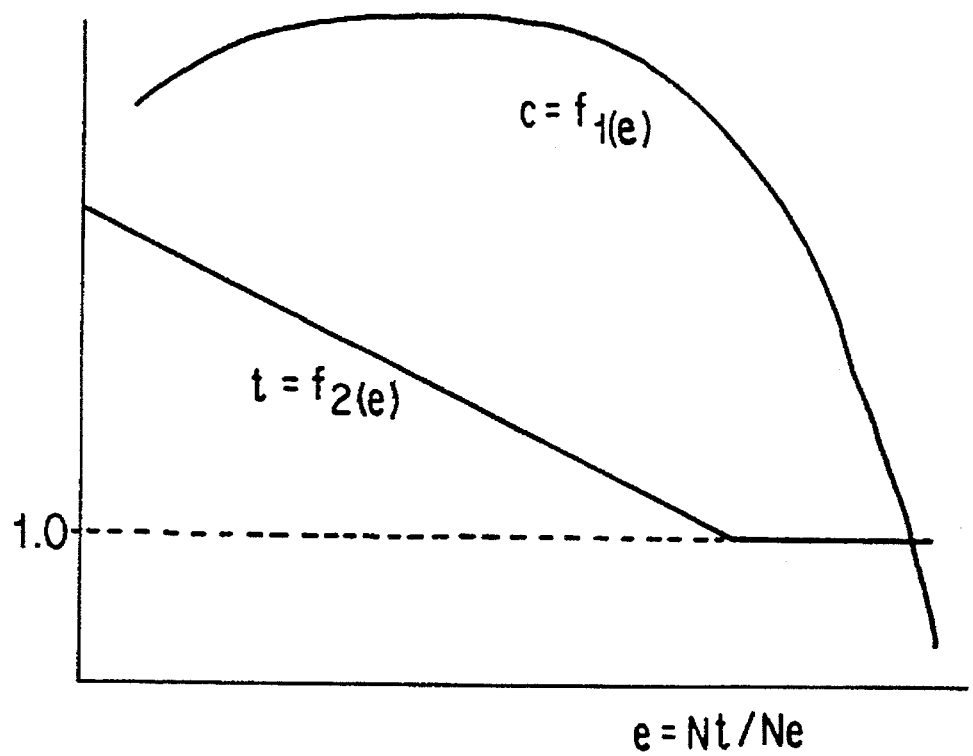
FIG. 14(a) is a torque converter characteristic diagram for operation during economy operation mode of the control system of FIGS. 1–3.
Figure 14B:
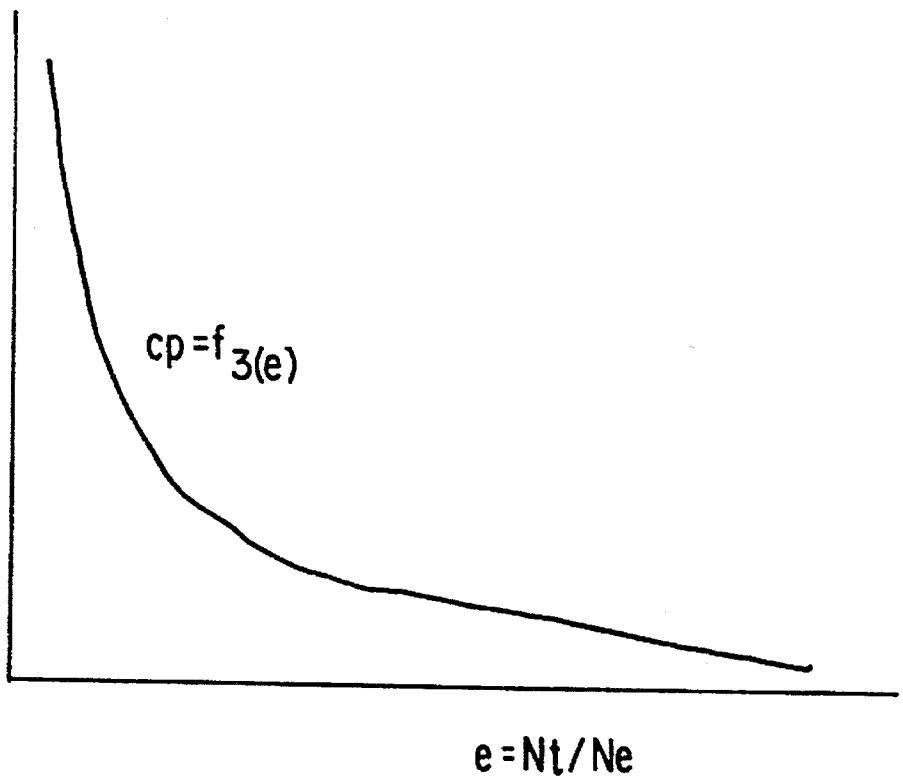
FIG. 14(b) is a diagram representing the pump capacity coefficient characteristics for operation during economy operation mode of the control system of FIGS. 1–3.
Figure 15A:
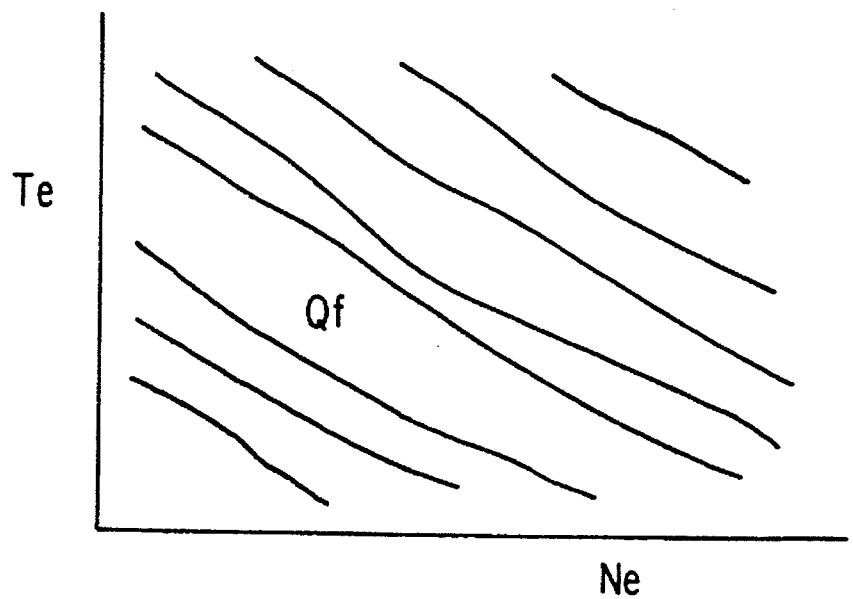
FIG. 15 is a diagram representing the fuel consumption volume characteristic for operation during economy operation mode of the control system of FIGS. 1–3.
Figure 15B:
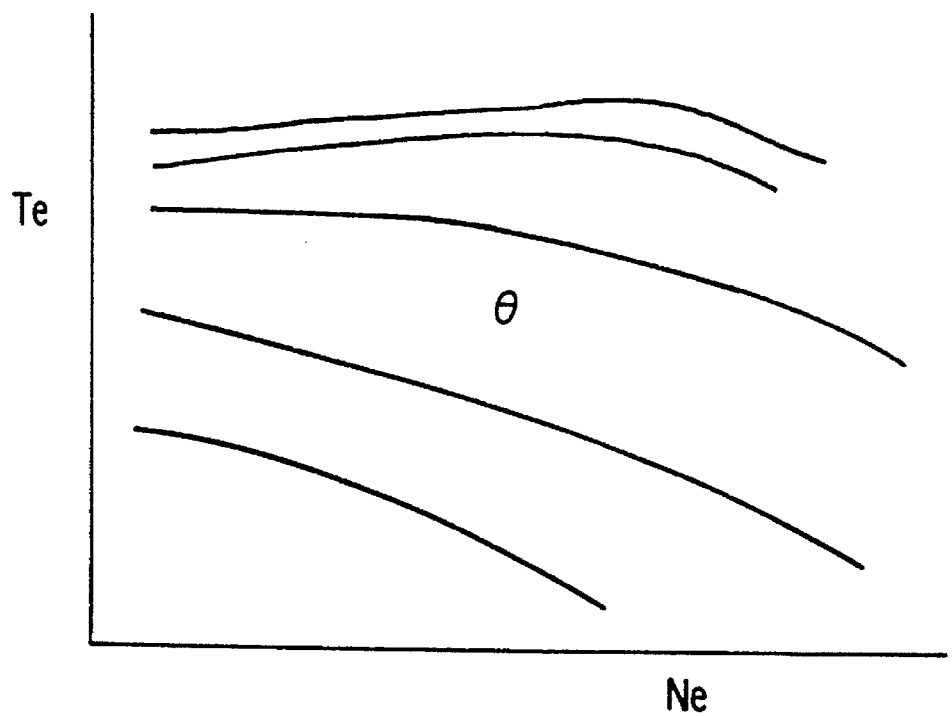

FIG. 13 shows the fuel cost speed change point calculation steps, and FIG. 15(b) illustrates the throttle angle characteristics. Engine speed Ne, vehicle speed Vsp, throttle angle, and speed change ratio i are read in step 150. In step 151, engine torque Te is searched from the data on throttle angle θ and engine speed Ne. In step 152, the engine torque Te and current speed change ratio i are used to calculate the speed changer output shaft torque, so-called drive shaft torque To. A torque sensor may be used for drive shaft torque To according to certain preferred embodiments. In step 153, engine torque Te(n) for each speed change ratio is calculated using the To calculated as above and speed change ratio i(n) of the speed changer mounted on both wheels. The above description relates to the case where the four-speed speed changer is used. In step 154, the speed change ratio i(n) is used to calculate the Vsp and engine speed Ne(n) for each speed change ratio. In the case of lock-up, the calculation for the torque converter is not necessary, resulting in simplified processing. In step 155, the Te(n) and Ne(n) calculated as above are used to search the Qf data table of Table 15(a) for each speed change ratio, and thereby obtain the speed change ratio i(n) for the minimum fuel consumption. Then speed change ratio i(n) for the minimum fuel consumption is output in step 156, and the variable of the speed change ratio which is output in step 157, said flag Flg4, in the case of n=4, for example, being set to 1. In FIG. 14(a), the lock up state is obtained when speed change e=1, and torque converter transmission efficiency is 100 percent in this case. Thus, the engine torque and engine speed can be obtained directly from the drive shaft torque and vehicle speed.

Figure 16:
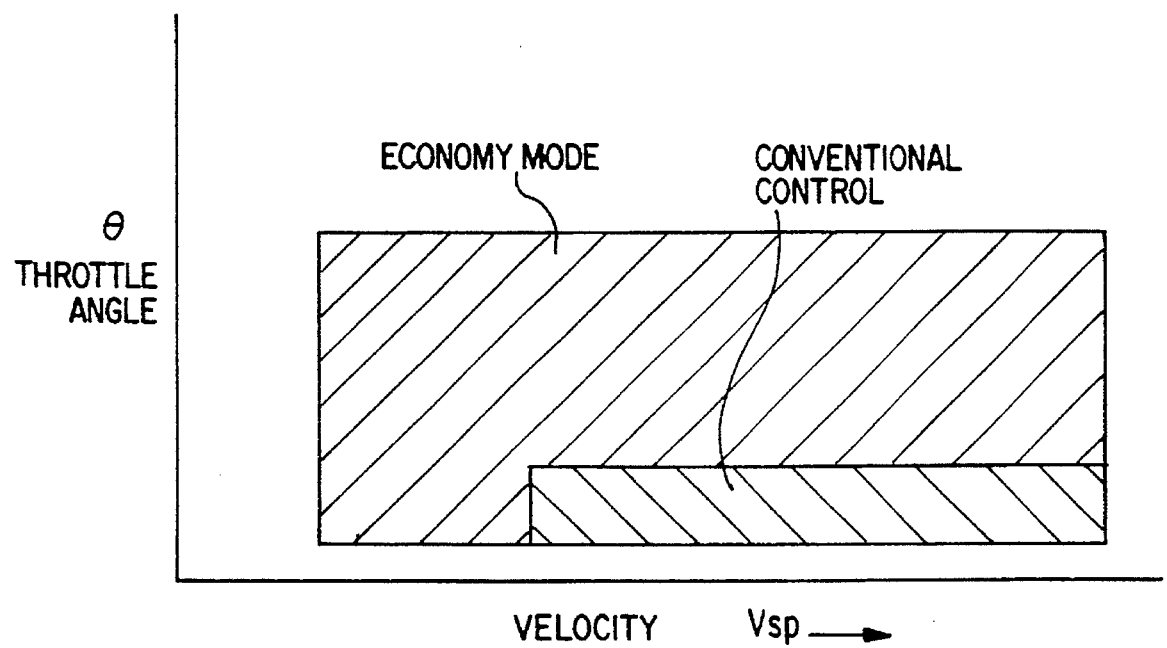
FIG. 16 is a lock up operation area comparative diagram for operation during economy operation mode of the control system of FIGS. 1–3.

FIG. 16 is a comparative drawing showing the lock up operation area. According to the conventional control as shown in the hatched area, a narrow operation area at the lower right side is locked up in order to ensure compatibility between operability and fuel cost. According to the present invention, by contrast, the target is placed on only the reduction in fuel cost ignoring the operability, so a considerable operation area is locked up. However, lock up must be suspended in the low car speed area to prevent engine stop, and in the area of high throttle angle to prevent high torque from occurring. It is also contemplated to design the control system so as to lock up even the area of high throttle angle if the driver does not require high torque. This will greatly reduce the fuel cost in the practical operation area.

Figure 17:
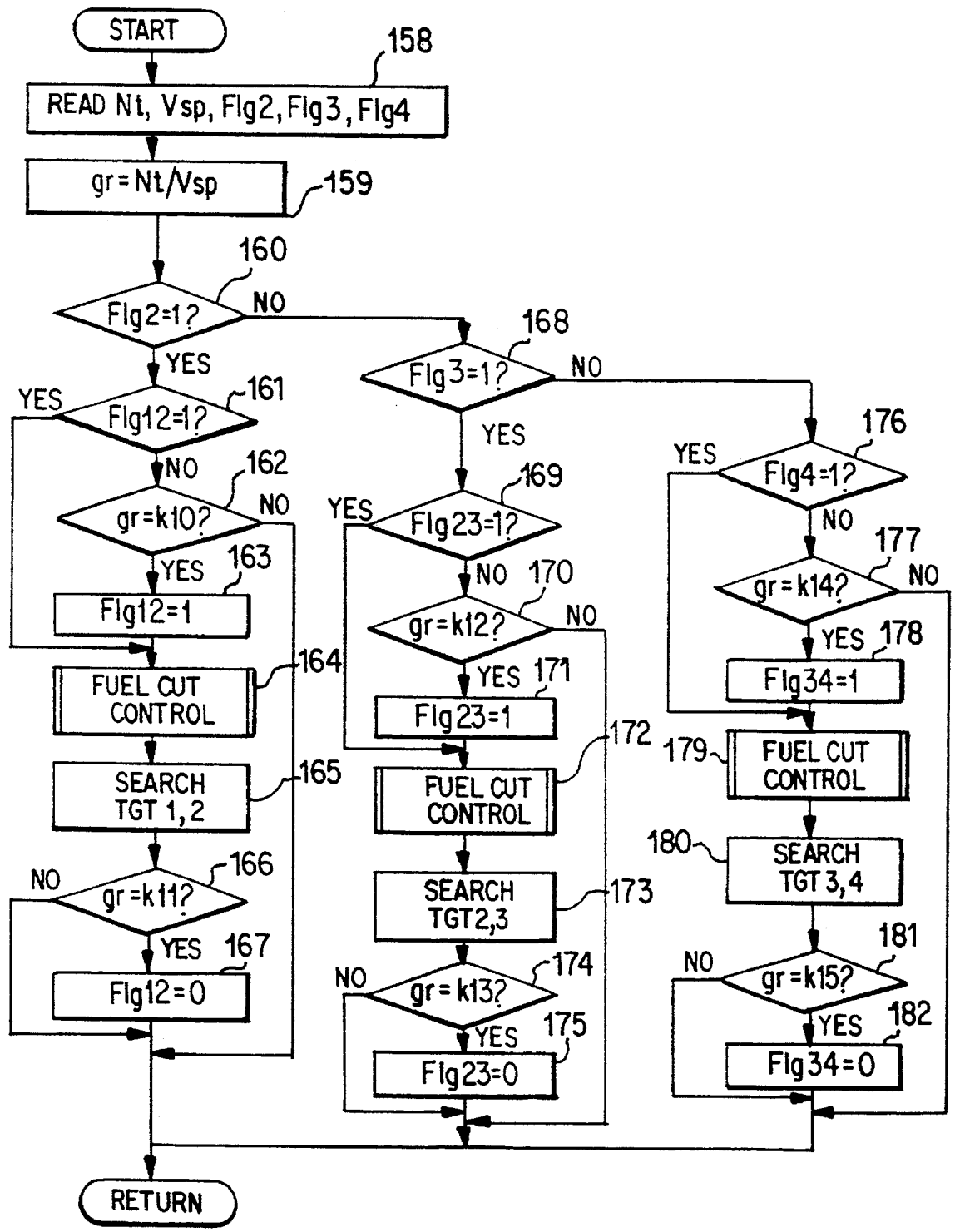
FIG. 17 is a control flow chart for fuel cut control at the time of speed change for operation during economy operation mode of the control system of FIGS. 1–3.

FIG. 17 is a control flow chart for fuel cut control during speed changes when operating in the economy mode. This is an attempt to cut the fuel cost by using as the fuel cut control the firing time control during speed change (compare the firing time control for "sports" operation mode shown in FIG. 10).

Firstly, turbine speed Nt, vehicle speed Vsp, speed-2 flag Flg2, speed-3 flag Flg3 and speed-4 flag Flg4 are read in step 158, and the input/output speed ratio of the speed change mechanism, so-called gear ratio gr, is calculated from the Nt/Vsp in processing step 159. Then whether Flg2 is 1 or not is checked in step 160. If the result is YES, whether speed change control starting Flag12 is 1 or not is checked in step 161. If the result is not 1, the system goes to step 162 to check whether the gear ratio gr has reached the speed change control starting time constant klO or not. This constant must be changed with consideration given to control response according to engine torque control procedures (firing time, fuel volume and air volume). Thus, if the result is YES in step 162, Flgl2 is set to 1. That is, the system determines that engine torque control and hydraulic control during speed change must be made. Then the target hydraulic pressures for fuel cut control and speed change from speed-1 to speed-2 are searched and output in step 164 and step 165, respectively. Then whether the gear ratio gr has reached the speed change control terminating time constant kll or not is checked in step 166. If the result is YES, Flgl2 is set to 0 in processing step 167. After that, engine control and hydraulic control during speed change are carried out in steps 168 to 182 according to a similar control pattern for the other gear shifting sequences.

Figure 18:
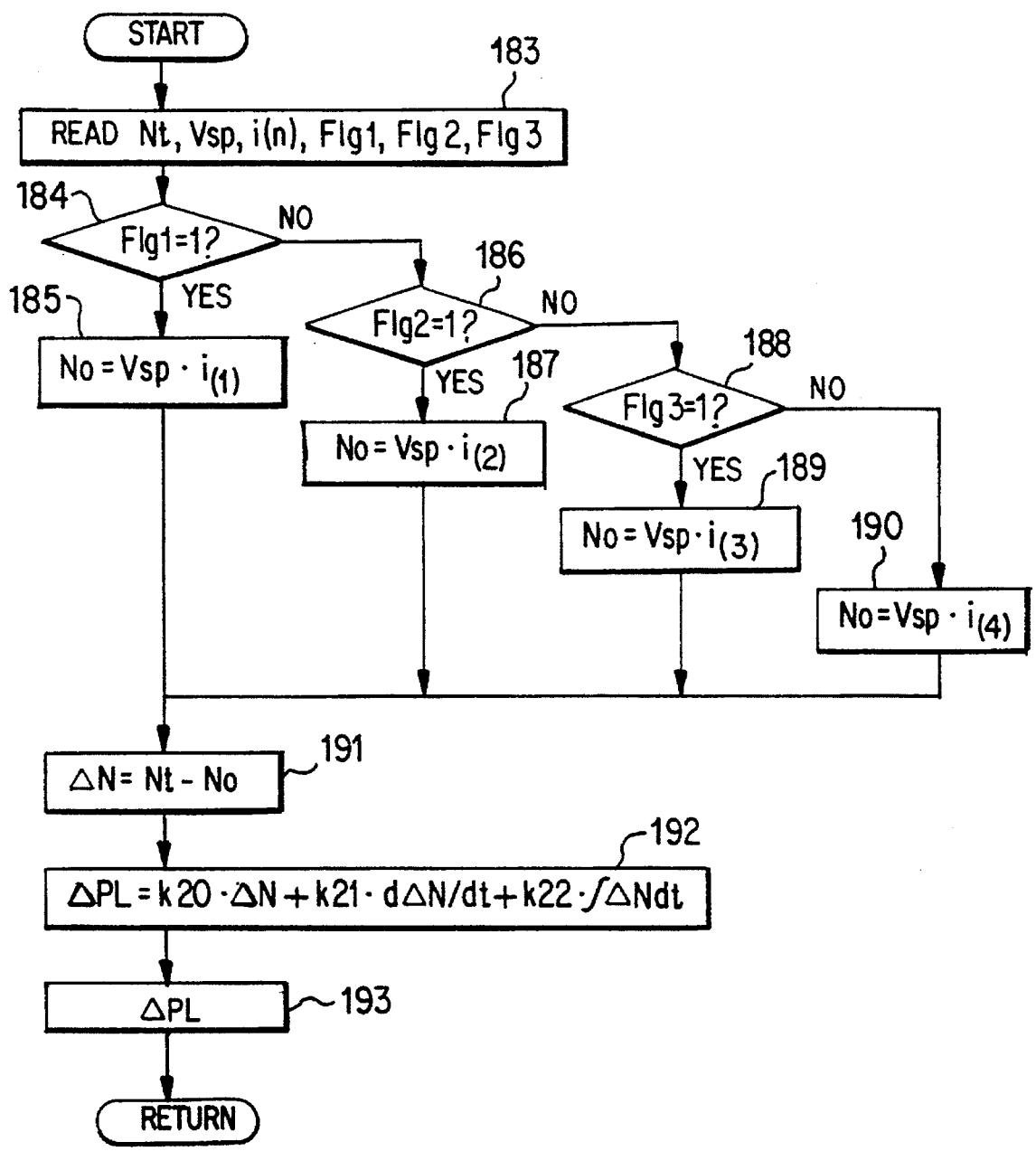
FIG. 18 is a control flow chart for clutch operation hydraulic pressure high-efficiency control for operation during economy operation mode of the control system of FIGS. 1–3.

FIG. 18 is a flow chart representing the clutch operation for hydraulic pressure high-efficiency control. Firstly, turbine speed Nt, vehicle speed Vsp, speed change ratio i(n), speed-1 flag Flgl, speed-2 flag Flg2 and speed-3 flag Flg3 are read in step 183, and whether the current speed rate is speed-1 or not is checked in step 184. If the result is YES, the converted turbine speed No is calculated from the Vsp in step 185. The converted turbine speed at each of speed-2, speed-3 and speed-4 is calculated in steps 186 to 190; then the difference ΔN between the actual turbine speed Nt and said converted turbine speed No is calculated in step 191. Compensatory target hydraulic pressure ΔPL is calculated from the function (PID control) of the said ΔN in step 192, and is output in step 193. This will ensure hydraulic control on the level immediately before the clutch in the speed changer slips.

Figure 19:
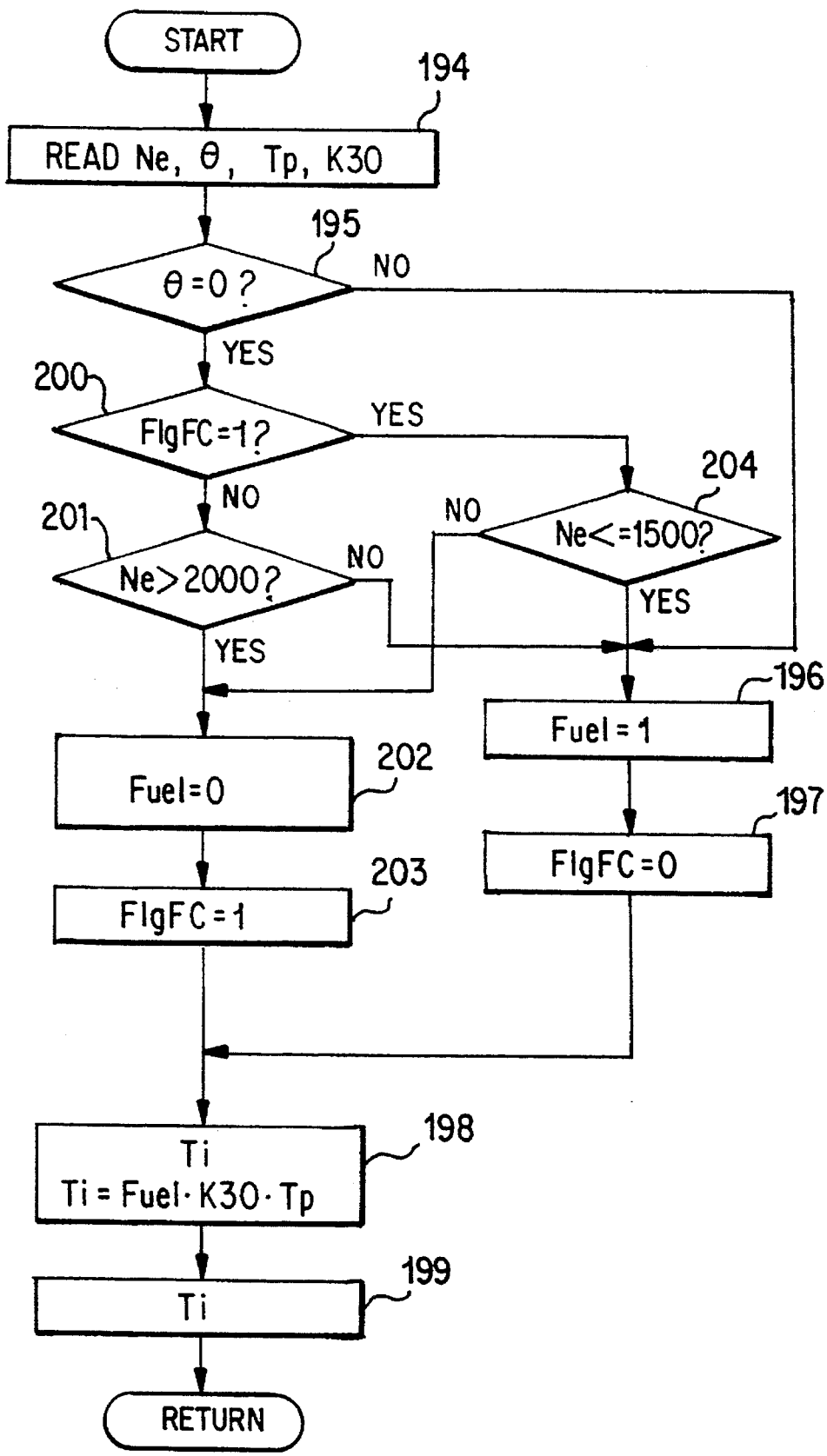
FIG. 19 is a control flow chart for fuel cut control at the time of deceleration for operation during economy operation mode of the control system of FIGS. 1–3.

FIG. 19 is a control flow chart for fuel cut control during deceleration. This is an attempt to cut the fuel cost by a combined use of the fuel cut control at the time of deceleration which is obtained from calculation of the speed change line to achieve said fuel cost reduction. Firstly in step 194, the system reads in the variable k30 for calculation of the fuel injection volume which changes with engine speed Ne, throttle angle θ, basic fuel injection volume Tp, and engine water temperature. In step 195, the system checks whether throttle angle θ is zero or not, that is, whether it is in the deceleration state or not. If the result is NO, in steps 196 and 197, fuel cut coefficient Fuel is set to 1; and the flag FlgFC is set to 0, which determines if the speed is the possible fuel cut speed during deceleration or not. Then fuel injection volume Ti is calculated from Fuel·k30·Tp in step 198 and the result Ti is output in step 199. If the result is YES in step 195, whether said FlgFC is 1 or not is checked in step 200. If the result is NO, the step 201 determines if the Ne is greater than 2000 rpm, for example, or not. If it is greater, said Fuel is set to 1 in step 202, and said FlgFC is set to 0 in step 203. Then the system returns to step 198. If the FlgFC is already 1 in step 200, a check if the Ne is equal to or smaller than 1500 rpm is made in step 204. This is to check fuel cut termination engine speed, and is determined with consideration given to engine stalling.

Figure 20:
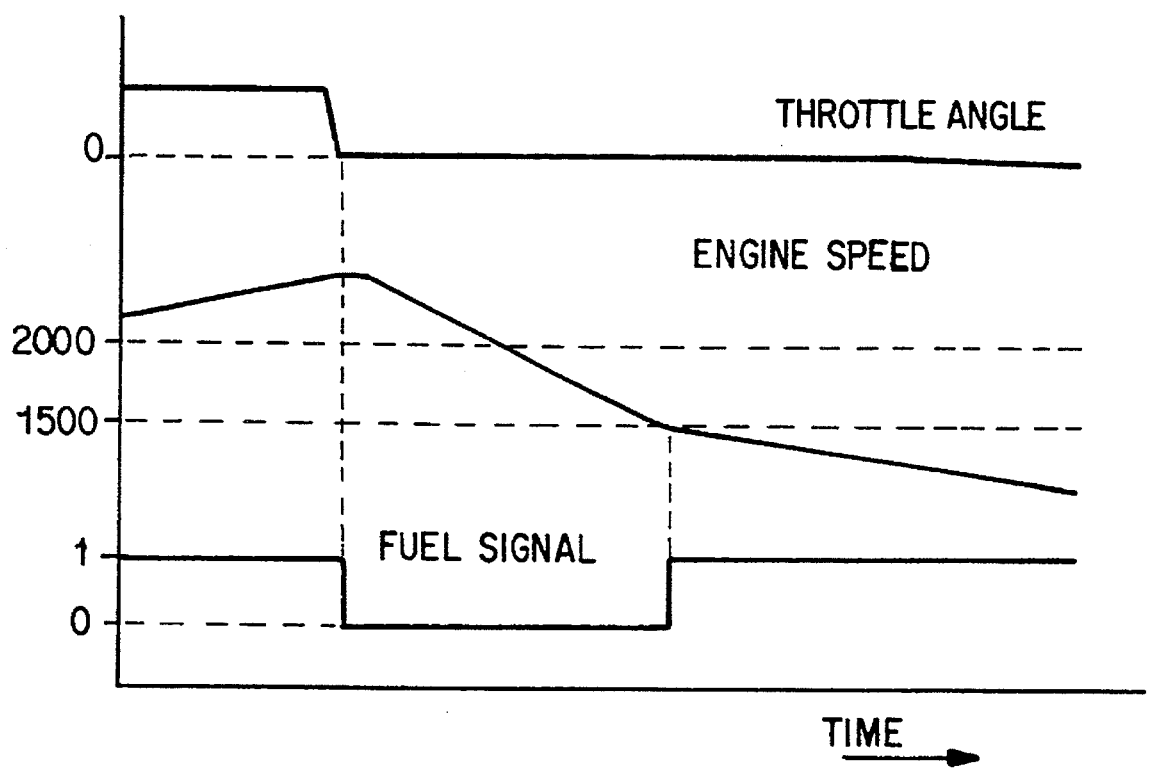
FIG. 20 is a time chart for the control depicted in FIG. 19.

FIG. 20 is a time chart for the control steps of FIG. 19. The system detects that the throttle is fully opened. Since the engine speed is equal to or greater than 2000 rpm, Fuel signal is set to 0. Furthermore, the engine speed is subjected to abrupt reduction for fuel cutting; then the Fuel signal is set to 1 at 1500 rpm, resulting in suspension of fuel cutting or fuel cut off.

Figure 21:
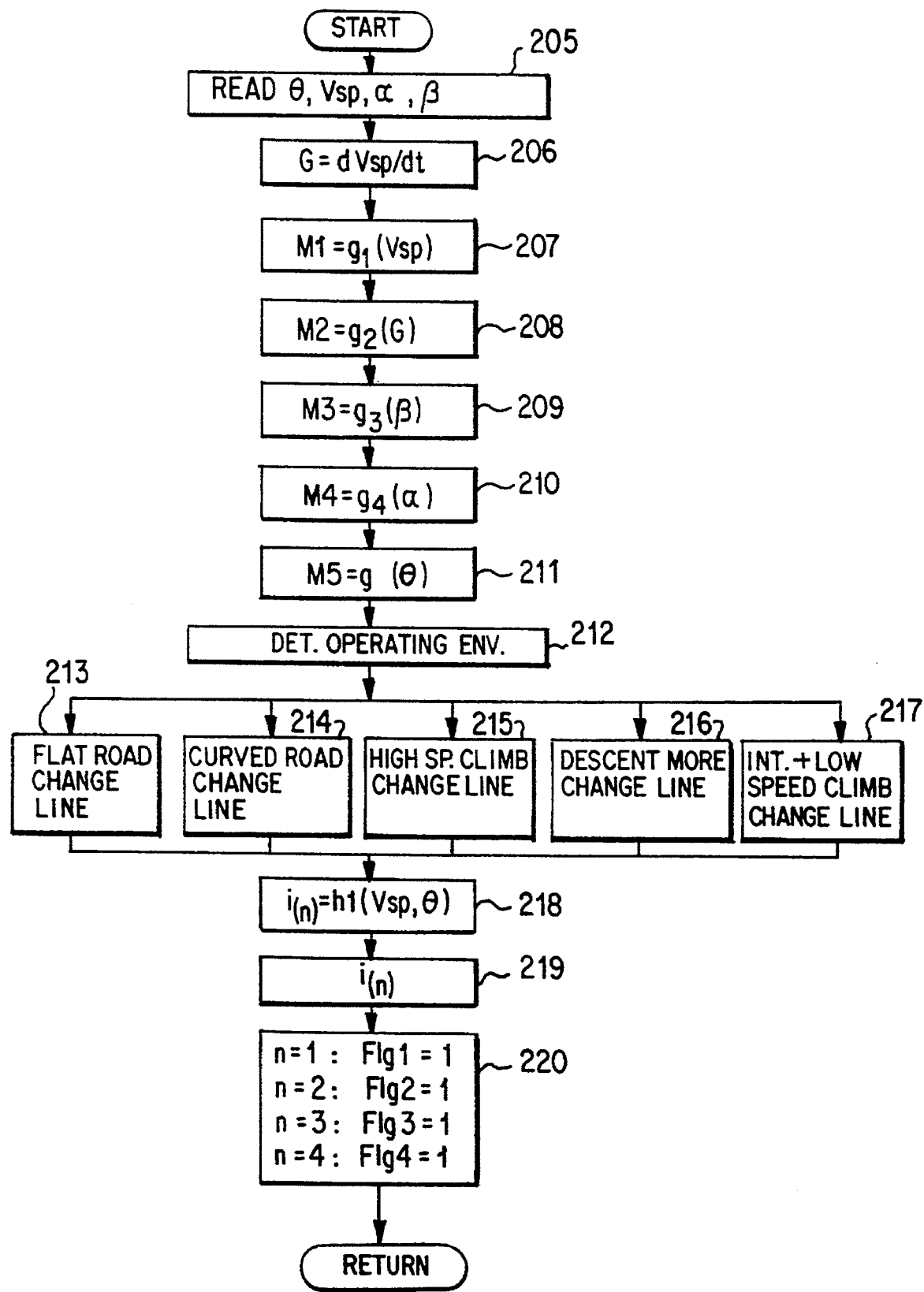
FIG. 21 is a control flow chart for speed change point control fuzzy inference during comfortable operation mode of the control system of FIGS. 1–3.
Figure 24:
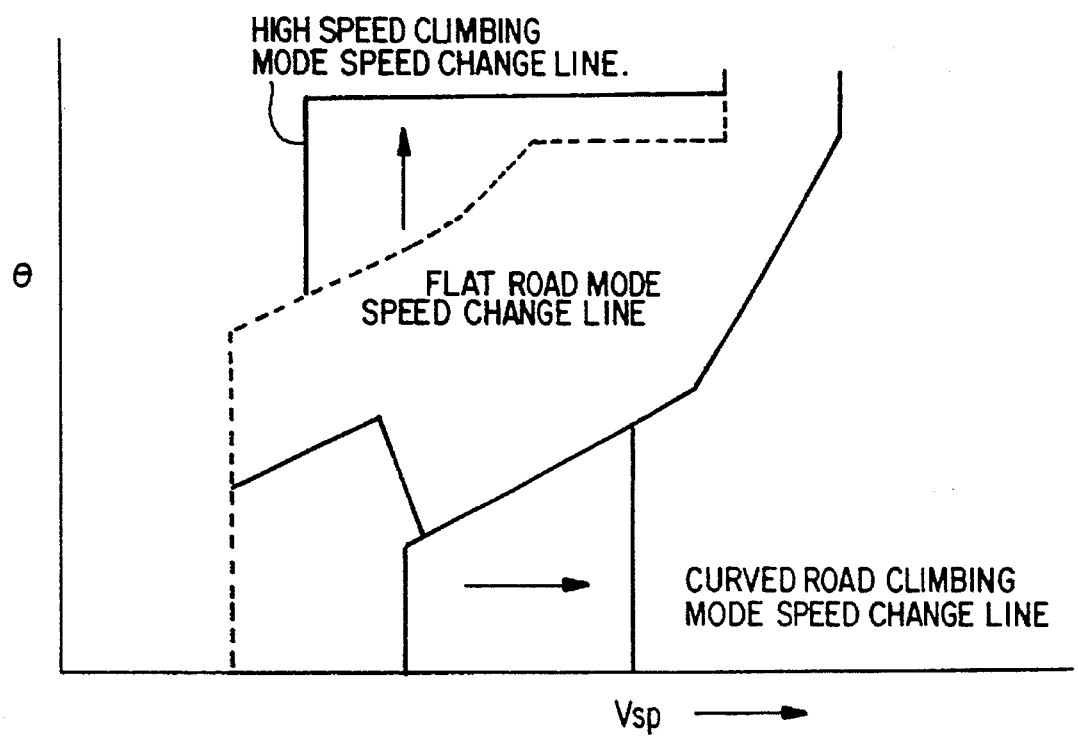
FIG. 24 shows an example of modifying the speed change line according to road conditions during comfortable operation mode of the control system of FIGS. 1–3.

The following describes control functions in the "comfortable" operation mode with reference to FIGS. 21 to 29. FIG. 21 is a control flow chart of speed change point control according to fuzzy inference, and FIG. 22 shows the membership function sensed by the driver with respect to vehicle speed. FIG. 23 represents the result of the determination of the road conditions from the fuzzy rule, and FIG. 24 gives an example of changing the speed change line according to the road conditions. In FIG. 21, throttle angle θ, vehicle speed Vsp, steering wheel angle α and road gradient β are read in step 205. Said β is obtained from equation (4):

$$\beta = (To \cdot TL \cdot K_{100} W \cdot d\ Vsp/dt)/k_{200} \qquad \text{equation (4)}$$

where

To: drive shaft torque
TL: flat road running resistance
W: car inertial weight
$K_{100}$, $k_{200}$: constants The To can be calculated by using the torque converter or torque sensor equation. Furthermore, it can be calculated from equation (5) when the acceleration sensor is used.

$$\beta = \sin^{1}(Gs - d\ Vsp/dt)/g \quad (5) \qquad \text{equation (5)}$$

where g: gravitational acceleration
Gs: front-rear acceleration sensor signal

In step 206, the front-rear acceleration G is calculated by differentiation of Vsp. In steps 207 to 211, membership function M(n) is calculated according to each of functions g(n) of Vsp, G, α, β and θ. They use the membership function as shown in FIG. 22. In step 212 the system determines the current running environment using the fuzzy rule for the road conditions shown in FIG. 23. If the vehicle speed is low and the road gradient is great in ascent with great steering wheel angle and intermediate throttle angle, then step 214 is executed to select the speed change line of the curved road climbing mode. Determination of similar running environment is carried out in steps 215 to 217. In other cases, normal speed change line control in the flat road mode is performed in step 213. In step 218, speed change line executed in the selection of said speed change line is obtained from the function $h_1$ between Vsp and θ (table search in FIG. 24) to calculate speed change ratio i(n). Speed change ratio i(n) is output in step 219. When the variable of the speed change ratio which is output in step 220, n=3, for example, then flag Flg3 is set to 1. In FIG. 24, the up-shift line in the flat road mode is shown in the solid line, while the down-shift line is shown in the broken line. For example, when the curved road climbing mode is selected according to fuzzy rule, the figure is changed to the thin arrow mark "→" shown in FIG. 24, thereby avoiding the busy shift when running around the corner. When the high speed climbing mode is selected, it is changed into the solid line indicated by the upward arrow mark, thereby avoiding the busy shift when running at the high speed.

Figure 25:
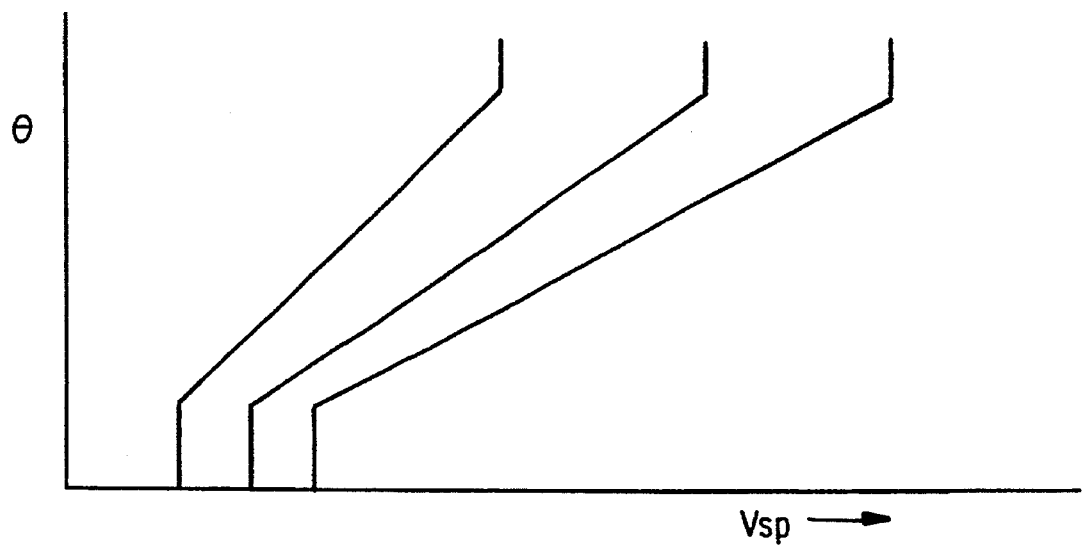
FIG. 25 is an equi-interval speed change line table during comfortable operation mode of the control system of FIGS. 1–3.
Figure 26:
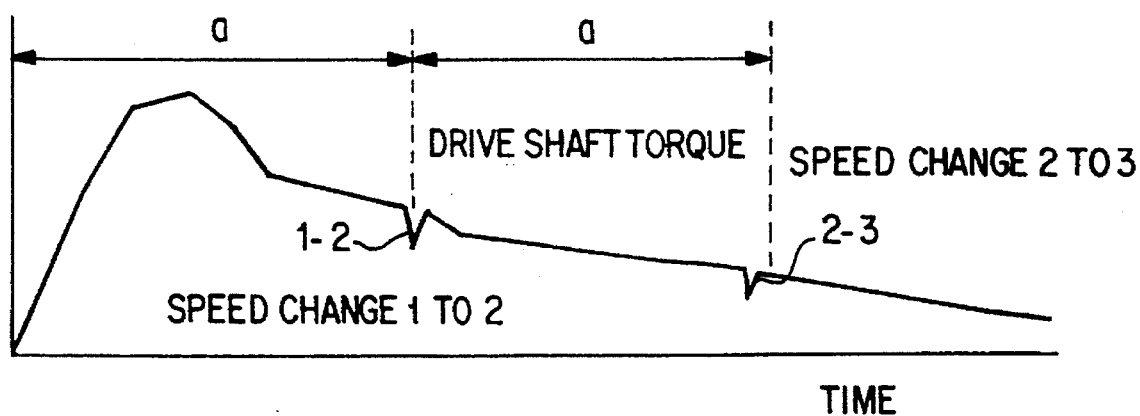
FIG. 26 represents a drive shaft torque characteristics for execution of FIG. 25 during comfortable operation mode of the control system of FIGS. 1–3.

FIG. 25 shows the speed change line table for the equi-interval speed change and drive shaft torque characteristics during execution of operation in the comfortable mode. In FIG. 25, the speed change line is stored such that time interval from the start to the speed change to speed-1 to -2, and that from speed change to speed-1 to -2 to speed change to speed-2 to -3 will be the same (time intervals a), for example, as shown in FIG. 26, with greater emphasis placed on comfortable operability than reduced fuel cost. Furthermore, it is preferred that the relationship between the magnitude of drive shaft torque and equi-intervals be proportionate.

Figure 27:
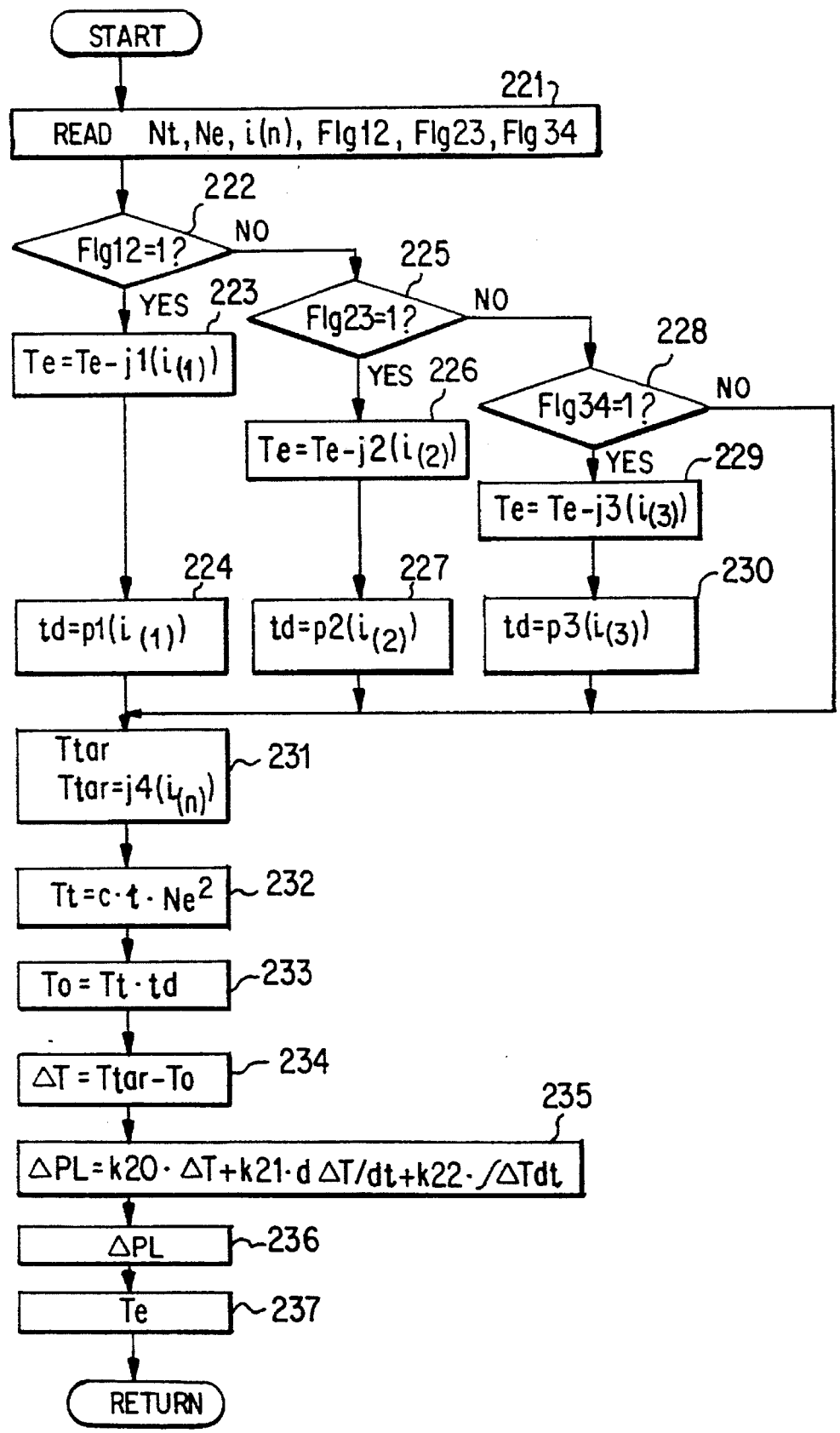
FIG. 27 is a torque control flow chart for upshift during comfortable operation mode of the control system of FIGS. 1–3.

FIG. 27 is a control flow chart representing torque control during up-shift. Firstly, turbine speed Nt, engine speed Ne, speed change ratio i(n), flag Flgl2 showing speed change speed-1 to -2, flag Flg23 showing speed change from speed-2 to -3, and flag Flg34 showing speed change from speed-3 to -4 are read in step 221. In step 222, the system checks whether the current speed change is from speed 1 to -2 or not. If the result is YES, the speed is being Changed to speed-1 to -2 as shown in FIG. 8, and the system sets the target engine torque Te in step 223, with a specified amount $j_1(i)1$ corresponding to the speed change to the speed-1 to -2 subtracted. The Te at this time varies according to firing time, fuel volume and air volume, so the table is selected according to each control item, and is output. In step 224, torque transmission ratio td to infer the drive shaft torque, as well as Flg 12=1, is obtained from the function p1 of i(1). Te and td in speed change of speed-2 and -3, and speed-3 and -4 are calculated in steps 225 to 230. In step 231, the target drive shaft torque Ttar for each speed change ratio i(n) is calculated according to function j4 (table search). In step 232, turbine torque Tt is calculated from equation (6).

$$Tt=c \cdot t \cdot Ne^2 \qquad \text{equation (6)}$$

where c: pump capacity coefficient t: torque ratio

In step 233, actual drive shaft torque To is inferred using the turbine torque Tt and torque transmission ratio td calculated as described herein. The difference ΔT between said drive shaft torque To and target drive shaft torque Ttar is calculated in step 234. In step 235, compensatory target hydraulic pressure ΔPL is obtained from the function of said ΔT (PID control), and the result is output in step 236. Furthermore, engine torque reduction volume Te is output in step 237. This will enable hydraulic control of torque feedback during the speed change, ensuring reduction in shocks during speed change.

Figure 28:
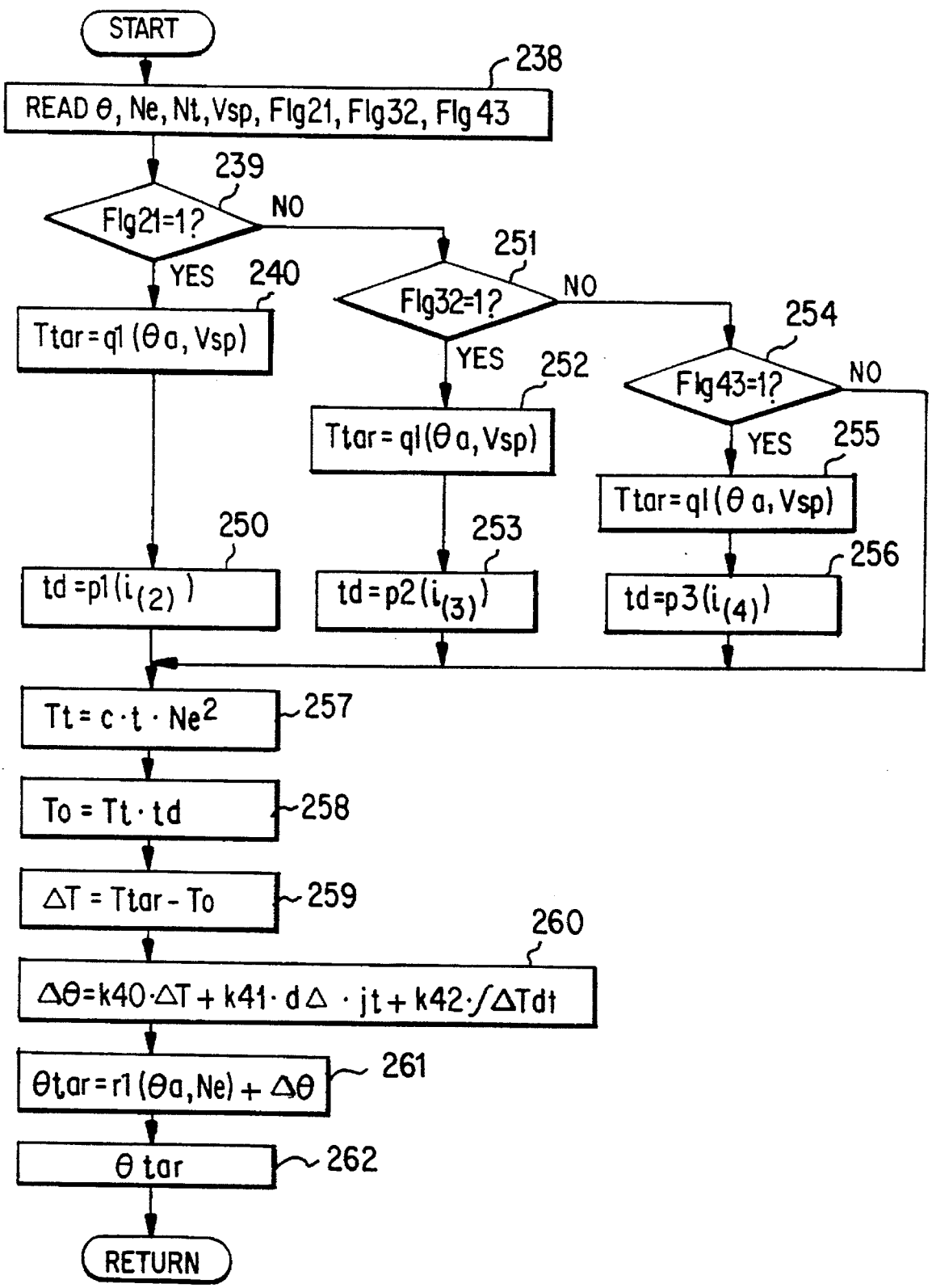
FIG. 28 is a torque control flow chart for downshift during comfortable operation mode of the control system of FIG. 1–3.
Figure 29:
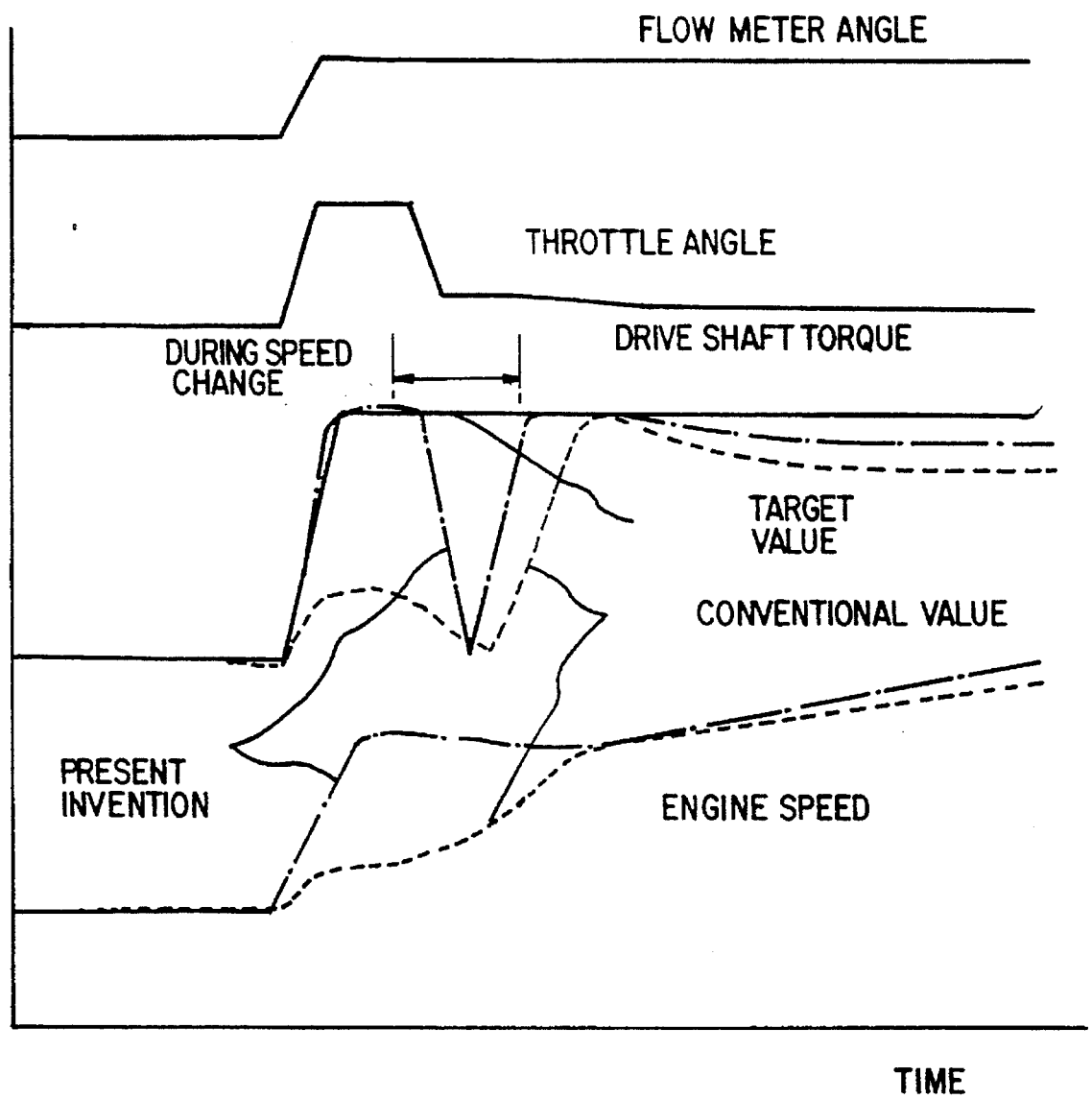
FIG. 29 is a time chart for execution of FIG. 28 during comfortable operation mode of the control system of FIGS. 1–3.

FIG. 28 is a control flow chart representing torque control during down-shift, and FIG. 29 is a time chart showing execution of FIG. 28. FIGS. 28 and 24 illustrate a preferred embodiment of control using the flow meter angle control, with a so-called electronically controlled throttle. Firstly, flow meter angle θa, turbine speed Ne, engine speed Ne, vehicle speed Vsp, flag Flg21 showing speed change to speed-2 from -1, flag Flg32 showing speed change from speed-3 to -2, flag Flg43 showing speed change from speed-4 to 3 are read in step 238. The system checks whether it is speed-2 to -1 or not in step 239. If the result is YES, the speed is being changed from speed-2 to -1, as shown in FIG. 9, and the step 240 is carried out. Then the target drive shaft torque Ttar, corresponding to the speed change from speed-2 to -1, current θa and Vsp, is calculated using the function $q_1$ (table search, etc.). In step 250, torque transmission ratio td to infer the drive shaft torque, as well as Flg21 =1, is obtained from the function $p_1$ of i(2). Ttar and td in speed change of speed-3 to -2, and speed-4 to -3 are calculated in steps 251 to 256. Then in step 257, the turbine torque Tt is calculated from equation (6), as is the case with the up-shift. In step 258, actual drive shaft torque To is inferred using the Tt and td calculated as above. The difference 4dT between the said drive shaft torque To and target drive shaft torque Ttar is calculated in step 259. Compensatory throttle angle Δθ is calculated from the function of said difference ΔT (PID control) in step 260. In step 261,target throttle angle θtar is obtained by including said difference in the calculation of normal target throttle angle ($r_1$ (θa, Ne)), and the result is output in step 262. In contrast to the conventional control shown by the broken line in FIG. 29, smooth down-shift, without torque difference before and after the speed change, is ensured in the torque feedback throttle control.

Figure 30:
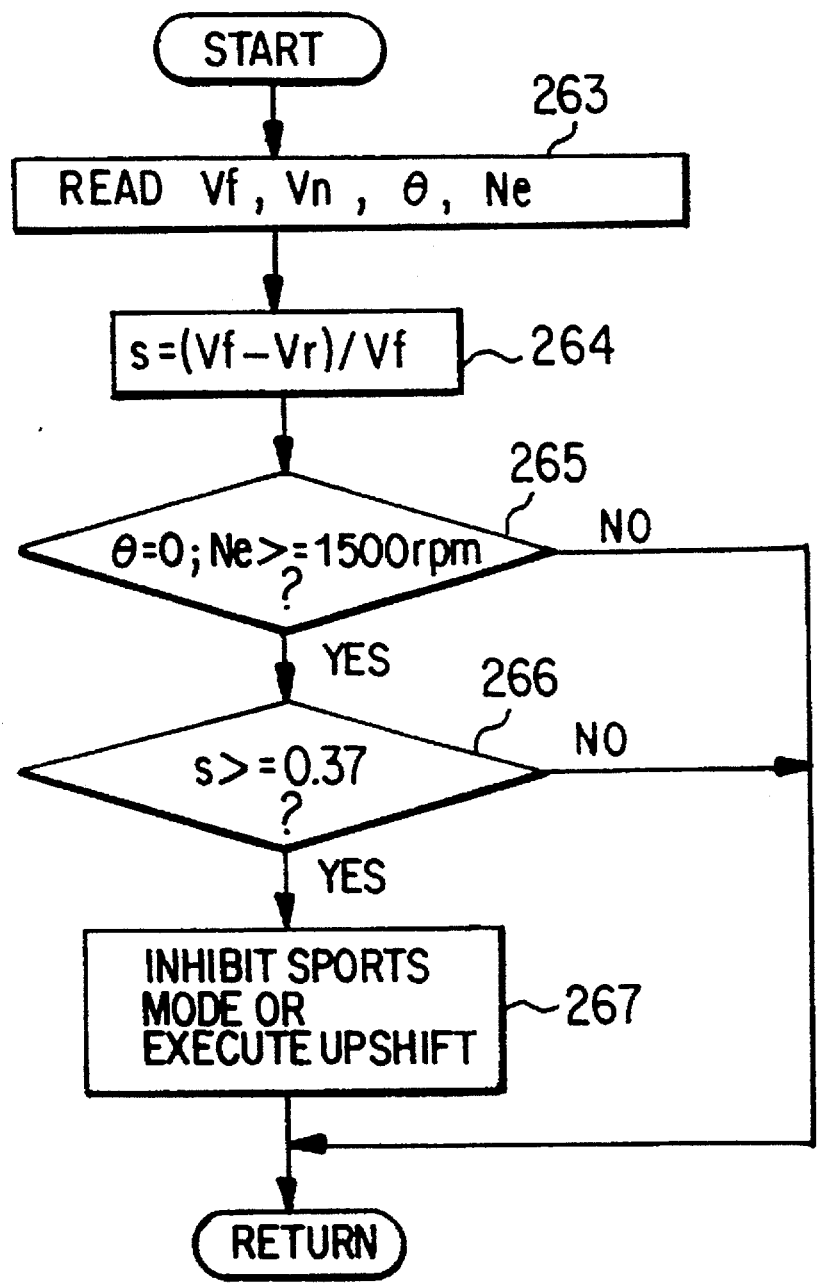
FIG. 30 is a fail safe control flow chart for engine brake and inhibition of operation in the sports operation mode during certain road surface and driving conditions, using the control system of FIGS. 1–3.

FIG. 30 depicts a fail safe control flow chart for engine braking. Firstly, the driven wheel velocity Vf, drive wheel velocity Vr, throttle angle 0, and engine speed Ne are read in step 263, and slip rate S is calculated according to equation (7) in step 264.

$$S=(Vf-Vr)/Vf \qquad \text{equation (7)}$$

Whether θ=0 and Ne ≧1500 rpm or not is checked in step 265. Here the system checks if engine brake control is being made in deceleration or not. If the result is YES, the system goes to step 266 to check if slip rate S is equal to or greater than 0.3 or not. In other words, the system checks if the road surface coefficient under engine brake control is small or not, and checks if the operating conditions are safe or not. If the result is YES, namely, if the system determines that the drive wheel is close to being locked by the engine brake control, then said sports operation mode is inhibited or forcibly shifted up, thereby ensuring car safety.

The present invention provides a system power train controller and control method to ensure operation of an automatic speed transmission driven car to be operated in different modes as selected by the driver. The system of the invention responds to car operation conditions and respective driver selected modes of operation with consequent different vehicle control functions suited to the individual driver's preferences.

In the preferred embodiments described, a four-forward speed gear automatic transmission was utilized. However, the present invention also contemplates embodiments with automatic transmissions having three forward gears, as well as with automatic transmissions having more than four forward speed gears.

Embodiments of the invention are also contemplated which sense different vehicle operating parameters than those described in detail for the preferred illustrated embodiments.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A motor vehicle control system comprising:

an automatic change speed transmission operable to shift between a plurality of transmission gears, a plurality of vehicle operating condition sensors for sensing respective vehicle operating conditions, an operating mode selector for accommodating vehicle operator selection of one of a plurality of vehicle operating modes, and a transmission control unit for automatically controlling the operation of the transmission as a function of the respective selected operating mode and as a function of a plurality of said operating conditions sensed by said sensors, said control unit being operable to control at least two control functions of said transmission as a function of sad operating conditions in respective different control patterns for respective different selected operating modes.

2. A control system according to claim 1, wherein said at least two control functions includes:

a speed change line control function establishing the time of initiation of transmission gear shifting steps, and a shifting time line control function establishing the duration of transmission gear shifting steps.

3. A motor vehicle power train system comprising:

a combustion engine having a fuel and air supply system, an automatic change speed transmission drivingly connected to the engine and operable to shift between a plurality of transmission gears, a plurality of vehicle operating condition sensors for sensing respective vehicle operating conditions, an operating mode selector for accommodating vehicle operator selection of one of a plurality of vehicle operating modes, and a control unit for automatically controlling the operation of at least one of the engine and transmission as a function of the respective selected operating mode and as a function of a plurality of said operating conditions sensed by said sensors, said control unit being operable to control at least two control functions of at least one of the engine and transmission as a function of said operating conditions in respective different control patterns for respective different selected operating modes.

4. A power train system according to claim 3, wherein said at least two control functions include:

a speed change line control function establishing the time of initiation of transmission gear shifting steps, and a shifting time line control function establishing the duration of transmission gear shifting steps.

5. A motor vehicle control system according to claim 1, wherein said transmission includes the following control functions:

a speed change line control function establishing the time of initiation of transmission gear shifting steps, and a shifting time line control function establishing the duration of transmission gear shifting steps, and a transmission lockup control function.

6. A motor vehicle control system according to claim 5, wherein said control unit is operable to control said speed change line control function and said transmission locking control function.

7. A control system according to claim 1, wherein said operating mode selector accommodates vehicle operator selection of three vehicle operating modes.

8. A control system according to claim 7, wherein said three vehicle operating modes include a sports operation mode, an economy operation mode, and a comfortable operation mode.

9. A control system according to claim 8, wherein said control unit is operable to effect different speed change line control functions establishing different times of initiation of automatic transmission gear shifting steps for each of the sports operation mode, the economy operation mode, and the comfortable operation mode.

10. A control system according to claim 9, wherein said control unit is operable to effect different shifting time line control functions establishing different durations of automatic transmission gear shifting steps for each of the sports operation mode, the economy operation mode, and the comfortable operation mode.

11. A control system according to claim 9, wherein said control unit is operable to effect different shifting time line control functions establishing different durations of automatic transmission gear shifting steps for each of the sports operation mode, the economy operation mode, and the comfortable operation mode.

12. A control system according to claim 7, wherein said control unit includes means for automatically inhibiting operation in said sports operation mode whenever said vehicle operating condition sensors detect a vehicle operating condition which would be unsafe in said sport operation mode.

13. A control system according to claim 7, wherein said plurality of vehicle operating condition sensors include:

(i) a driven wheel velocity sensor for sensing driver wheel velocity $V_f$, and (ii) a drive wheel velocity sensor, for sensing drive wheel velocity $V_r$, wherein said control unit includes means for computing a slip rate S equal to $(v_f - V_r)/V_f$, and wherein said control unit includes means for automatically inhibiting operation in said sports operation mode whenever said slip rate S is above a predetermined value.

14. A control system according to claim 8, wherein said plurality of vehicle operating condition sensors include:

(i) a driven wheel velocity sensor for sensing driver wheel velocity $V_f$, (ii) a drive wheel velocity sensor, for sensing drive wheel velocity $V_r$, (iii) an engine intake air volume sensor, (iv) a vehicle speed sensor, (v) an engine speed sensor, (vi) a turbine speed sensor for sensing speed of a turbine arranged in said drive train between a vehicle engine and the change speed transmission, (vii) a throttle angle sensor, (viii) a steering wheel angle sensor, (ix) a vehicle acceleration sensor, (x) an engine output shaft torque sensor, and (xi) an accelerator pedal angle sensor.

15. A control system according to claim 14, wherein said control unit includes means for controlling a speed change point solenoid, a clutch pressure solenoid, a lock-up solenoid, a fuel injection valve, and a throttle valve.

16. A motor vehicle power train system according to claim 3, wherein said transmission includes the following control functions:

a speed change line control function establishing the time of initiation of transmission gear shifting steps, and a shifting time line control function establishing the duration of transmission gear shifting steps, and a transmission lockup control function.

17. A motor vehicle power train system according to claim 16, wherein said control unit is operable to control said speed change line control function and said transmission locking control function.

18. A method of operating a motor vehicle power train system including:

a combustion engine having a fuel and air supply system, an automatic change speed transmission drivingly connected to the engine and operable to shift between a plurality of transmission gears, and a plurality of vehicle operating condition sensors for sensing respective vehicle operating conditions, said method comprising:

vehicle operator selection of one of a plurality of vehicle operating modes, and automatically controlling the operation of at least one of the engine and transmission as a function of the respective selected operating mode and as a function of a plurality of said operating conditions sensed by said sensors, with control of at least two control functions of at least one of the engine and transmission as a function of said operating conditions in respective different control patterns for respective different selected operating modes.

19. A method of operating a motor vehicle power train system according to claim 18, wherein said at least two control functions include:

a speed change line control function establishing the time of initiation of transmission gear shifting steps, and a shifting time line control function establishing the duration of transmission gear shifting steps.

20. A method of operating a motor vehicle power train system according to claim 19, wherein said vehicle operating modes include a sports operation mode, an economy operation mode, and a comfortable operation mode.

21. A method of operating a motor vehicle power train system according to claim 20, wherein said control functions include establishing different times of initiation of automatic transmission gear shifting steps for each of the sports operation mode, the economy operation mode, and the comfortable operation mode.

22. A method of operating a motor vehicle power train system according to claim 20, wherein said control functions are operable to effect different shifting time line control functions establishing different durations of automatic transmission gear shifting steps for each of the sports operation mode, the economy operation mode, and the comfortable operation mode.

23. A method of operating a motor vehicle power train system according to claim 21, wherein said control functions are operable to effect different shifting time line control functions establishing different durations of automatic transmission gear shifting steps for each of the sports operation mode, the economy operation mode, and the comfortable operation mode.

24. A motor vehicle control system comprising:

an automatic change speed transmission operable to shift between a plurality of transmission gears, a plurality of vehicle operating condition sensors for sensing respective vehicle operating conditions, an operating mode selector for accommodating vehicle operator selection of one of a plurality of vehicle operating modes, and a computer control unit programmed to automatically control at least two control functions of said transmission as a function of said operating conditions in respective different control patterns for respective different selected operating modes.

25. A motor vehicle control system according to claim 24, wherein one of said at least two control functions includes:

a speed change line control function establishing the time of initiation of transmission gear shifting steps.

26. A motor vehicle control system according to claim 24, wherein one of said at least two control functions includes:

a shifting time line control function establishing the duration of transmission gear shifting steps.

27. A motor vehicle control system according to claim 26, wherein a speed change line control function establishing the time of initiation of transmission gear shifting steps.

28. A motor vehicle control system according to claim 24, wherein said transmission includes the following control functions:

a speed change line control function establishing the time of initiation of transmission gear shifting steps, and a shifting time line control function establishing the duration of transmission gear shifting steps, and a transmission lockup control function.

29. A motor vehicle control system according to claim 28, wherein said control unit is operable to control said speed change line control function and said transmission locking control function.

\* \* \* \* \*